(12) United States Patent
Callahan

(10) Patent No.: US 10,943,189 B2
(45) Date of Patent: Mar. 9, 2021

(54) SYSTEM AND METHOD FOR RESERVING AND RENTING SEATING

(71) Applicant: Thomas Callahan, Lubbock, TX (US)

(72) Inventor: Thomas Callahan, Lubbock, TX (US)

( * ) Notice: Subject to any disclaimer, the term of this patent is extended or adjusted under 35 U.S.C. 154(b) by 0 days.

(21) Appl. No.: 16/744,817

(22) Filed: Jan. 16, 2020

(65) Prior Publication Data

US 2020/0242519 A1 Jul. 30, 2020

Related U.S. Application Data

(60) Provisional application No. 62/796,197, filed on Jan. 24, 2019.

(51) Int. Cl.
*G06Q 10/02* (2012.01)
*E01F 13/02* (2006.01)
*A47C 1/14* (2006.01)

(52) U.S. Cl.
CPC ........... *G06Q 10/02* (2013.01); *E01F 13/028* (2013.01); *A47C 1/143* (2013.01)

(58) Field of Classification Search
CPC ........ G06Q 10/02; E01F 13/022; E01F 13/04; A47C 1/143
USPC .......... 705/5; 340/541; 297/188.08; 235/375
See application file for complete search history.

(56) References Cited

U.S. PATENT DOCUMENTS

| 162,894 A | 5/1921 | Moody |
| 6,085,671 A | 7/2000 | Kerr et al. |
| 6,189,968 B1 | 2/2001 | Emanuel et al. |
| 8,565,044 B1 * | 10/2013 | Spiker ...................... G04F 1/005 368/108 |
| 8,587,446 B2 | 11/2013 | Hefforen |
| 2009/0108647 A1 * | 4/2009 | Bowman ................ A47C 31/11 297/217.1 |
| 2011/0050442 A1 * | 3/2011 | Hefferon ................ G08B 5/221 340/679 |
| 2011/0308434 A1 * | 12/2011 | Holobinko .............. E05G 1/005 109/23 |

(Continued)

FOREIGN PATENT DOCUMENTS

| DE | 202004019169 | 4/2006 |
| DE | 202004019169 U1 * | 4/2006 ......... G07C 9/00309 |

(Continued)

*Primary Examiner* — George Chen
*Assistant Examiner* — Freda A Nelson
(74) *Attorney, Agent, or Firm* — Scheef & Stone, LLP; Robin L. Barnes

(57) ABSTRACT

A method and system for reserving seating at a venue using a band system associated with rentable seating, the band system comprising a retractable band, controller, user interface, and sensors to detect band position or tampering or unauthorized use of the seating. A closed position indicates the seating may be available for rental, subject to prior reservations, and an open position indicates the seating is not available for rental. Requested reservations or rental time are compared to prior reservations to determine if seating is available for rental. An alert is initiated if tampering or unauthorized use is detected or a rental period ends and the band is still in the open position. Optionally, goods or services may be ordered by a user renting seating, orders and alerts monitored, and a user's rental activity may be tracked for rewards or limitation purposes.

18 Claims, 16 Drawing Sheets

(56) References Cited

U.S. PATENT DOCUMENTS

| | | | |
|---|---|---|---|
| 2012/0119907 A1* | 5/2012 | Teuchert | G08B 5/006 |
| | | | 340/541 |
| 2014/0039946 A1 | 2/2014 | Spiker et al. | |
| 2015/0000778 A1 | 4/2015 | Trongone | |
| 2015/0090778 A1* | 4/2015 | Trongone | G09F 23/00 |
| | | | 235/375 |
| 2016/0120321 A1 | 5/2016 | Callahan et al. | |
| 2017/0164742 A1* | 6/2017 | Hay | G06Q 10/02 |
| 2017/0167093 A1* | 6/2017 | Punzengruber | E01F 13/022 |
| 2017/0364835 A1* | 12/2017 | Baker | G06Q 10/02 |
| 2018/0170709 A1* | 6/2018 | Chen | B65H 75/446 |
| 2019/0057325 A1* | 2/2019 | Ishii | G06Q 10/04 |
| 2020/0167701 A1* | 5/2020 | Debono | G06F 9/542 |

FOREIGN PATENT DOCUMENTS

| | | |
|---|---|---|
| GB | 2247095 | 2/1992 |
| WO | WO200013152 | 3/2000 |

* cited by examiner

SYSTEM AND METHOD FOR RESERVING AND RENTING SEATING

CROSS-REFERENCE TO RELATED APPLICATION

This application claims the benefit of U.S. provisional patent application No. 62/796,197 filed Jan. 24, 2019.

BACKGROUND OF THE INVENTION

1. Field of the Invention

This invention relates to a system and method for reserving chairs or a private or semi-private area at a venue, such as a resort swimming pool or a night club, using a retractable band with tamper resistant features indicating whether a chair or area has been reserved or may be available for rental and to prevent unauthorized use of the chair or area.

2. Description of Related Art

A problem frequently encountered in entertainment venues is a lack of available seating. For example, at hotel and resort swimming pools, guests will frequently place towels or personal items on a poolside lounge chair early in the morning to claim the chair for their personal use, frequently for many hours when the guest is not actually using the chair or even in the pool area. This prevents other guests who are actually in the pool area from finding a place to sit.

In addition to placing a towel or personal item on a chair, there are known prior art devices for indicating a chair has been reserved. For example, U.S. Patent Application Publication No. 2009/0108647 discloses a sleeve-like device that slips over the back of a chair and has wording (such as "reserved") printed on it to let people know the chair has been reserved. Similarly, U.S. Pat. No. 6,189,968 discloses a band with wording indicating a chair has been reserved. The band wraps around a seat or a back of the chair and the ends of the band are held together with a hook and loop fastener. These simple devices could easily be tampered with by removing them from the chair, allowing unauthorized use of the reserved seating. Additionally, these devices do not include any way of allowing a user to pay for having the chair reserved.

There are also timer-type reservation systems, such as that disclosed in U.S. Pat. No. 8,565,044. A timer device is placed on the top of a seat back and has a flag, similar to a mailbox flag, that moves between a raised position and a lowered position to indicate whether the chair is reserved. The device also includes a manually operable service request flag so a user can indicate a request for food or drink, which must be visually seen by a venue employee to be able to provide the requested service. This device does not include any way of allowing a user to pay for having the chair reserved and the device does not prevent unauthorized use of the chair.

Online rental systems for poolside lounge chairs are also known in the prior art. For example, U.S. Patent Application Publication No. 2017/0164742 discloses a luxury motorized lounge chair that may be rented in advance via a website. A user selects an available chair, reserves the chair, and pays for rental time all via the website, which gives the user an access code that must be entered on a control screen on the lounge chair to activate the motorized functions of the chair. When not reserved in advance, the lounge chair can also be activated by using a hotel room key or credit card reader on the lounge chair, or via smart phone payment, to allow use of the chair on a first-come-first-served basis. The lounge chair has back rests at both ends to allow a user to face in different directions without having to rotate the chair or to allow two people to use the chair at the same time. When a rental period ends, the two backrests move to a forward position to block a middle seating section of the chair and the motorized features are disabled. Although the forward position of the backrests is intended to prevent unauthorized use of the lounge chair, it does not prevent an unauthorized user from sitting on a foot end of the lounge chair's "upper skin" (area 32 in FIG. 6) without payment or even indicate to a user that the lounge chair should not be used in such a manner. It also does not alert a venue employee that a chair is being used in an unauthorized manner. The chair does have a pressure sensor in the laying deck to prevent the backrests from moving forward when the rental period ends and a user is still occupying the chair (to prevent injuring the user), with an alert that will sound until the user vacates the chair so the backrests can move to their forward position. However, this still does not prevent an unauthorized user from sitting on the upper skin of the chair. Additionally, this system only works for a lounge chair and is not useable for reserving other areas of a venue (such as a cabana or VIP area).

There is a need for a system and method that allows for chairs and areas of a venue to be reserved and rented for a paid period of time, that provides an easily understandable indicator of whether or not a chair or area has been reserved or may be available for rental, and includes tamper resistant features.

SUMMARY OF THE INVENTION

A reservation method and system according to a preferred embodiment of the invention allows a user reserve and pay for use of a chair or area at a venue in advance of visiting the venue and/or pay for rental of a chair or area for a period of time while at the venue, using a retractable band as an indicator of whether a chair or area has been reserved or may be available and having tamper resistant features. The method and system are useable to reserve and/or rent poolside lounge chairs at a hotel, beach chairs, chairs at dining tables, chairs or seats in theater, concert or sporting venues, and any other type of chair that a user may want to pay to occupy for a period of time. The method and system are also useable to reserve and/or rent areas of a venue, such as a VIP seating area in a nightclub, a poolside cabanas, a party room, a dining table, or any other collection of chairs or seats or a private or semi-private area.

According to one preferred embodiment, a reservation system comprises a retractable band system. According one preferred embodiment, a retractable band system comprises a first body configured to be mounted on or attached to a first post or to one side of a chair, a second body configured to be mounted on or attached to a second post or a second side of the chair, a spool attached to or disposed inside the first body, a connector receptacle attached to or disposed inside the second body, a retractable band that extends from the first body across a seating surface of the chair or an entry to an area to the second body, the band configured at one end to wind around the spool and configured at the other end with a connector to connect to the connector receptacle, a controller, and a sensor configured to sense movement of the band and/or whether the band is in a closed or open position. According to another preferred embodiment, the first and second body are configured like arm rests for use with a chair, particularly a chair that does not already have arm rests.

According to one preferred embodiment, a retractable band system further comprises a base configured to be mounted to an underside of a chair seat surface with the first and second bodies extending upwardly from opposite ends of the base. According to yet another preferred embodiment, a retractable band system further comprises a first post and a second post, each preferably having a base allowing the posts to stand upright from the ground or a floor.

According to yet another preferred embodiment, a band system comprises two or more bands disposed over and across a seat surface of a chair or an entry to an area in different configurations to provide increased protection against unauthorized access. According to one preferred embodiment for use with a chair, one band extends across a seat surface of the chair widthwise and the other band extends across a seat and/or back surface of the chair lengthwise in a plus sign or "t" shape. According to another preferred embodiment for use with a chair, the two bands are in an "X" configuration, preferably extending lengthwise across a chair from an upper end of a back rest on one side of the chair to a bottom end of a foot rest (for a lounge chair) or a seat surface (for a regular chair) on the other side of the chair. According to yet another preferred embodiment for use with an entry to an area, the two bands are in an "X" configuration or both bands are placed horizontally with one higher than the other, or one band is placed substantially horizontally and the other is placed substantially vertically (in a plus sign or "t" shape) to provide increased protection against unauthorized access. Each band is connected to a spool and a connector that is connectable to a receptacle as previously described for a single band configuration.

In these preferred embodiments, when the band is extended across the seat surface of the chair or across an entry to a venue area, the chair or area is available for rental (subject to prior reservations, if advance reservations are allowable), but the band indicates that a user should not sit in the chair or enter the area until a rental is authorized, such as by payment for a rental period. According to one preferred embodiment, a sensor is configured to sense movement of the band or pressure on a connector or connector receptacle while the band is still connected to the connector receptacle. If an unauthorized user attempts to bypass the band to access the chair or venue area, such as by sitting on the band, leaning against the band, pulling on the band, ducking under the band, or stepping over the band, the sensor will detect movement of the band or pressure and activate an alert indicating unauthorized access without payment for the rental.

According to one preferred embodiment, a controller comprises a microprocessor and a user interface, such as a keypad, scanner, or reader to allow for payment for rental time or to activate a previously paid reservation via a credit card, hotel key, smart pay device, confirmation code, personal identification information associated with a reservation, a QR code or a bar code on paper or a cell phone or tablet, or by an RFID or NFC reader. Most preferably, a controller is configured to send and receive data or signals from one or more other devices, such as a monitoring system, a booking system, a user's computing device or payment method, an optional audible or visual alarm, and/or an ordering system. According to another preferred embodiment, a controller is configured to receive data or signals from one or more sensors and configured to initiate an alert for unauthorized access. According to one preferred embodiment, an alert is an audible or visual (such as a flashing light) alarm. According to another preferred embodiment, an alert is a signal sent from the controller via wired or wireless communication to a monitoring system, a computing device of the venue, and/or an employee of the venue, such as via text message sent to the employee's cell phone.

According to another preferred embodiment, a reservation system and method comprises a booking system that allows a user to pre-reserve a chair or venue area via a website, mobile application, and/or a kiosk or computing device located at the venue. A booking system preferably allows a user to view chairs and/or areas that are available at various desired dates and times, to select one or more chairs and/or areas to be reserved for the user for a selected time period (a rental period), and to pay for the rental of the chair(s) and/or area(s). A booking system also preferably provides the user with suggestions of other seating that has availability if the user's initial selection is not available or has limited availability. According to yet another preferred embodiment, a booking system tracks a user's rental time and/or occupancy rate and limits the user's ability to add additional rental time or make future reservations based on predetermined criteria.

According to another preferred embodiment, a reservation system also preferably comprises a mapping and location system with data indicating a layout for the venue to show where available chairs and/or areas are located in relation to other features of the venue, such as a swimming pool, a bar, restrooms, shaded areas, or distance from a stage, which may be displayed for the user through the booking system when making a reservation.

According to another preferred embodiment, a reservation system and method comprises an ordering system that allows a user to order various goods or services from the venue and/or a third party vendor to be delivered to the user's reserved or occupied chair or area at a pre-selected time or as soon as possible after placing an order. Most preferably, an ordering system allows a user to order food, drinks, towels, umbrellas, to request a change to a television station or music station being broadcast at or near the user's chair or area, to order movies or videos displayed on a television or video screen at or near the user's chair or area, snorkeling gear, swim and water sport toys or equipment, massage services, swimming lessons, assistance with operation of the reservation system, and/or first aid services. According to another preferred embodiment, any goods or services ordered through an ordering system may be paid for by a user via a card reader or other scanner connected to the band system controller or through via a website or mobile app accessible by a user's computing device (such as a cell phone or tablet).

According to another preferred embodiment, a reservation system and method comprises a monitoring system that serves as an interface for employees of the venue and/or an operator of the reservation system to monitor various aspects of the reservation system. Most preferably, a monitoring system allows an employee of the venue and/or operator of the reservation system to be notified of (1) any tampering with a band system or unauthorized use or attempted use of a chair or area, (2) when a user has ordered goods or services through the ordering system, (3) the reservation status of each chair and/or area (whether it is available or has been rented and/or has an upcoming reservation), (4) general equipment status; (5) time remaining on any paid rental, and/or (5) any tampering with chairs (such as a user attempting to move a chair to another location).

According to other preferred embodiments, a reservation system, and particularly a band system, further comprises one or more of the following optional features: (1) lock box or safe to allow a user to store valuables in a secure manner; (2) solar panels and/or a battery to provide power to the controller, one or more sensors, lock box, and other components; (3) headphone jacks to allow a user to listen to music or television broadcasts, (4) a built in radio tuner or music selection keypad, (5) a television or video screen, and/or (6) a power outlet to allow a user to power personal electronic devices.

BRIEF DESCRIPTION OF THE DRAWINGS

The system and method of the invention is further described and explained in relation to the following drawings wherein.

DESCRIPTION OF THE PREFERRED EMBODIMENTS

Figure 1:
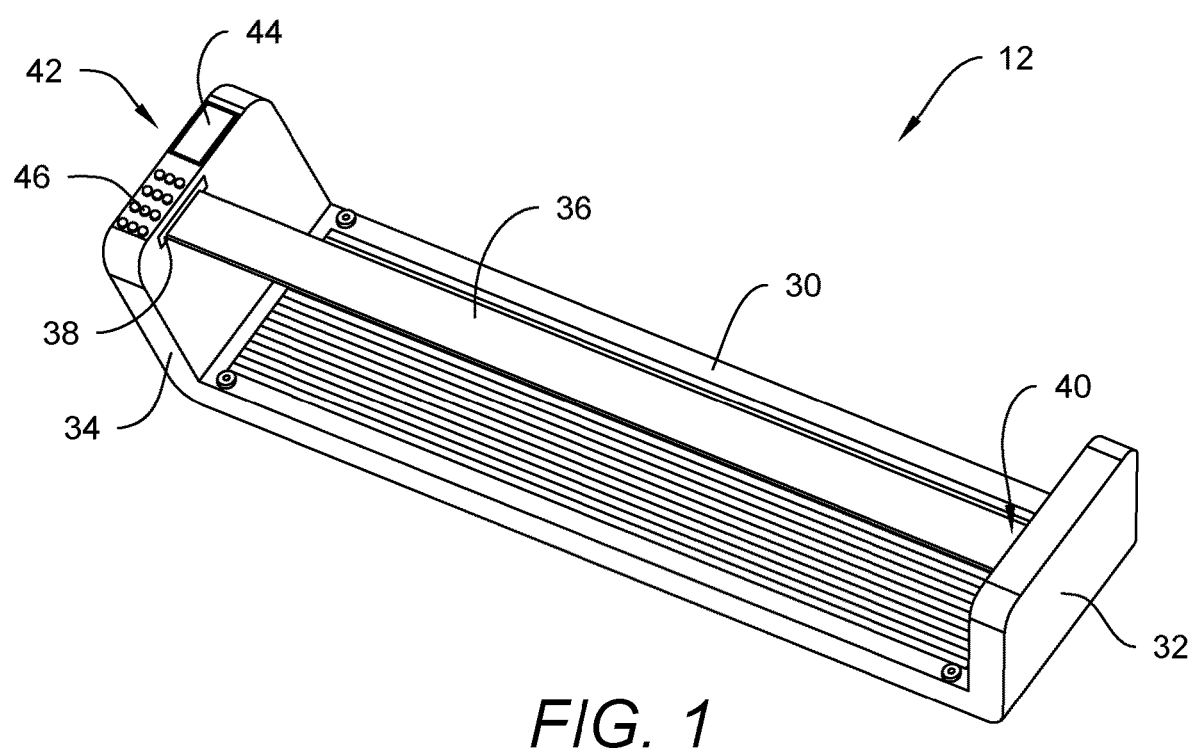
FIG. 1 is a top perspective view of a preferred embodiment of a band system according to the invention.

Preferred embodiments of a method or system 10 and 310 for reserving seating in a venue are shown in FIGS. 1-16. As used herein seating or similar terms refers to a specific chair (including any type of chair or seat, such as a dining chair, foldable theater or sports venue chair, bleachers, recliner, or lounge chair) and/or an area at a venue (such as a table, cabana, VIP area, or other private or semi-private area useable by more than one person, which may or may not include one or more chairs or seats). Reservation systems 10 and 310 preferably comprise a plurality of band systems 12, one for each chair and/or area available for rental or reservation.

Preferred embodiments of a band system 12 are shown in FIGS. 1-7. According to one preferred embodiment, band system 12 comprises a first body 32, a second body 34, and a retractable band 36. Most preferably, band system 12 further comprises one or more sensors configured to detect tampering with or unauthorized use of band system 12, a controller, a user interface 42, solar panels 33 and/or a battery 43, and optionally a locker or safe box 35. Controller is preferably disposed inside second body 34 or first body 32 and comprises a microprocessor (or a computing device). Each body 32, 34 is preferably configured to attach to or is integral with a base 30 or posts 132, 134. Alternatively, for use with a chair, bodies 32, 34 may be attached directly to chair, such as to a frame 54 of a chair. As another alternative for use with an area, bodies 32, 34 may be attached to walls on either side of an entry, such as opposite sides of a door frame, rather than using posts 132, 134. Bodies may be attached to a base 30, posts 132, 134, chair frame 54, walls, door frame, or other structure as needed to achieve a desired configuration for band(s) 36 across a seat surface or across an entry to an area, as further described below. When attached directly to a chair, bodies 32, 34 may be configured as arm rests to provide armrests on a chair that does not have them or to enlarge existing armrests, particularly the width of existing arm rests.

Optional base 30 is preferably configured to attach to an underside of a chair 52 (such as a lounge chair, but other types of chairs may also be used), most preferably to a frame 54 of the chair on an underside of a seating surface 58 closest to a back rest 56, where a user is most likely to sit when using chair 52. First body 32 and second body 34 both preferably extend from opposite ends of base 30 to above the seating surface 58 of chair 52. Optional posts 132, 134 preferably each comprise a base 50 allowing the posts to stand upright from the ground or floor. First body 32 preferably extends from an upper end of post 132 and second body 34 preferably extends from an upper end of post 134, but other locations along posts 132, 134 may be used, depending on the desired configuration for band(s) 36. Bodies 32, 34 may be integrally formed with base 30 or posts 132, 134 or may be separate and attachable to base 30 or posts 132, 134. Band system 12 may be integrated with new chairs 52 (or other types of chairs) or new construction of an entry for an area or may be an after-market add-on for existing chairs 52 (or other types of chairs) or existing entries.

Retractable band 36 is preferably connected at one end to a spool or rotating drum 40 attached to or, more preferably, disposed inside first body 32. A spool 40 connected at one end of band 36 is preferably configured to allow band 36 to be pulled away from first arm 32 to connect to connector receptacle 38 on second arm 34, to maintain tension on band 36 when connected to connector receptacle 38 in a closed position, and to rewind band 36 into a retracted or open position when it is disconnected from connector receptacle 38. When used with a chair and band 36 is connected to connector receptacle 38, band 36 is preferably disposed a few inches above seating surface 58 of chair 52 (shown as gap distance A on FIG. 4).

An opposite end of band 36 preferably comprises a connector, such as connector 70 (FIGS. 5-7), that is releasably attachable to a connector receptacle 38 attached to or disposed at least partially inside second body 34. Connector 70 preferably comprises a body 74, an upper lip 72, and a lower lip 76. Connector receptacle 38 preferably comprises a slot 37 configured to receive and mate with body 74, an upper recess area 41 configured to receive and mate with upper lip 72, and a lower recessed area 39 configured to receive and mate with lower lip 76. Alternatively, receptacle 38 may have protruding lips that mate with recessed areas on connector 70 or a combination of mating parts may be used. Most preferably, connector 70 connects to receptacle 38 by sliding body 74 into slot 37 from an upper end of receptacle 38 and is released by sliding body 74 out of slot 37. Most preferably, an upper end of connector 70, such as upper end of upper lip 72, sits flush with an upper end of second body 34 when connector 70 is connected to receptacle 38. Other shape configurations may be used with connector 70 and connector receptacle 38 that allow receptacle 38 to receive and mate with connector 70 to releasably secure band 36 to receptacle 38. Other types of connectors that allow secure and releasable attachment of band 36 to second body 34, such as a seat belt type connector, with corresponding changes in the receptacle may also be used. Most preferably, connector 70 may be locked into receptacle 38 to prevent unauthorized use without being unlocked by a controller for band system 12 when a rental has been paid. Such locking may physically prevent connector 70 from being removed from receptacle 38 or may be alarm type device (such as a magnetic connection) that will sound an alarm or trigger an alert if connector 70 is removed from receptacle 38 without a rental being paid.

Figure 2:
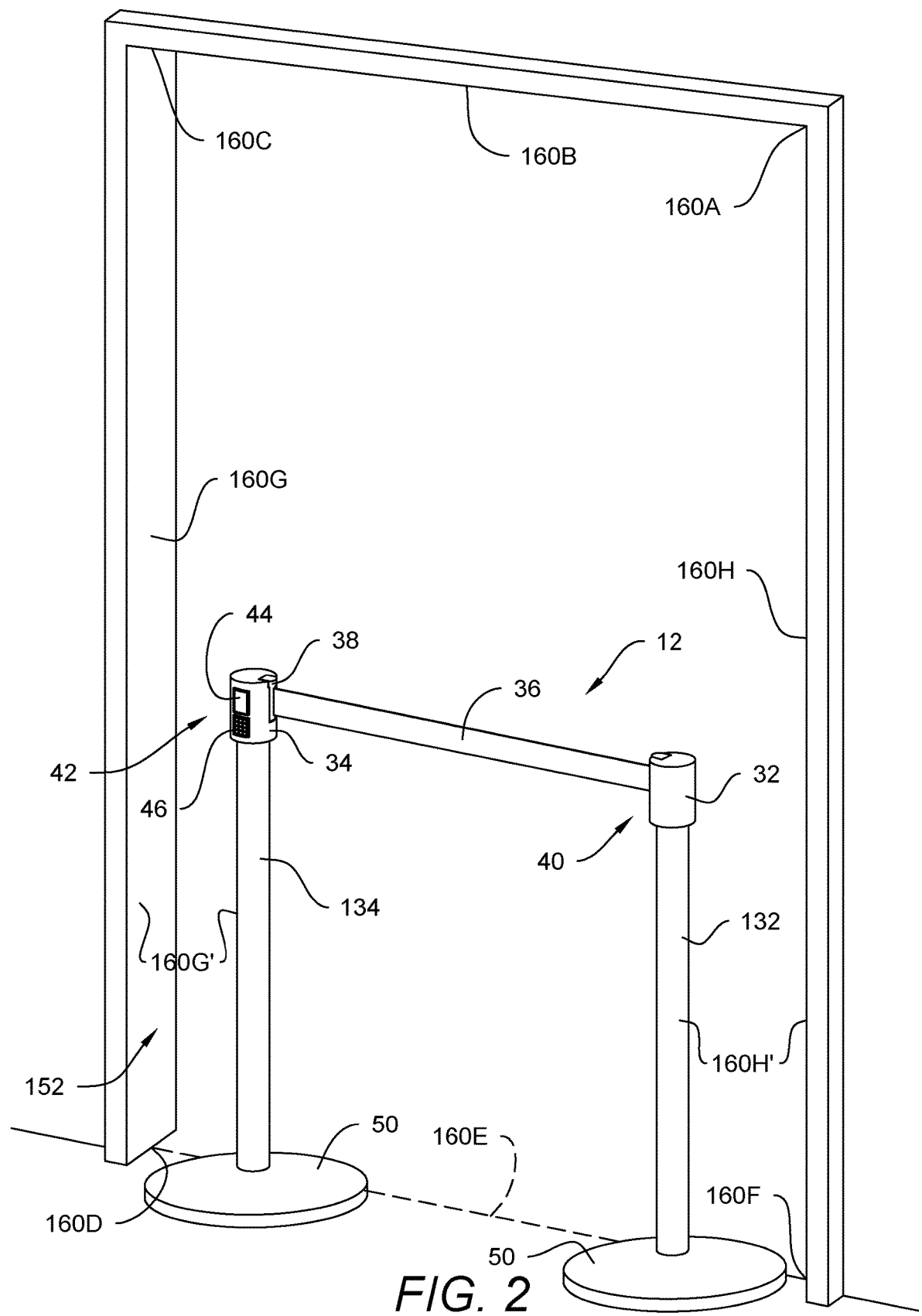
FIG. 2 is a front perspective view of another preferred embodiment of a band system according to the invention.
Figure 3:
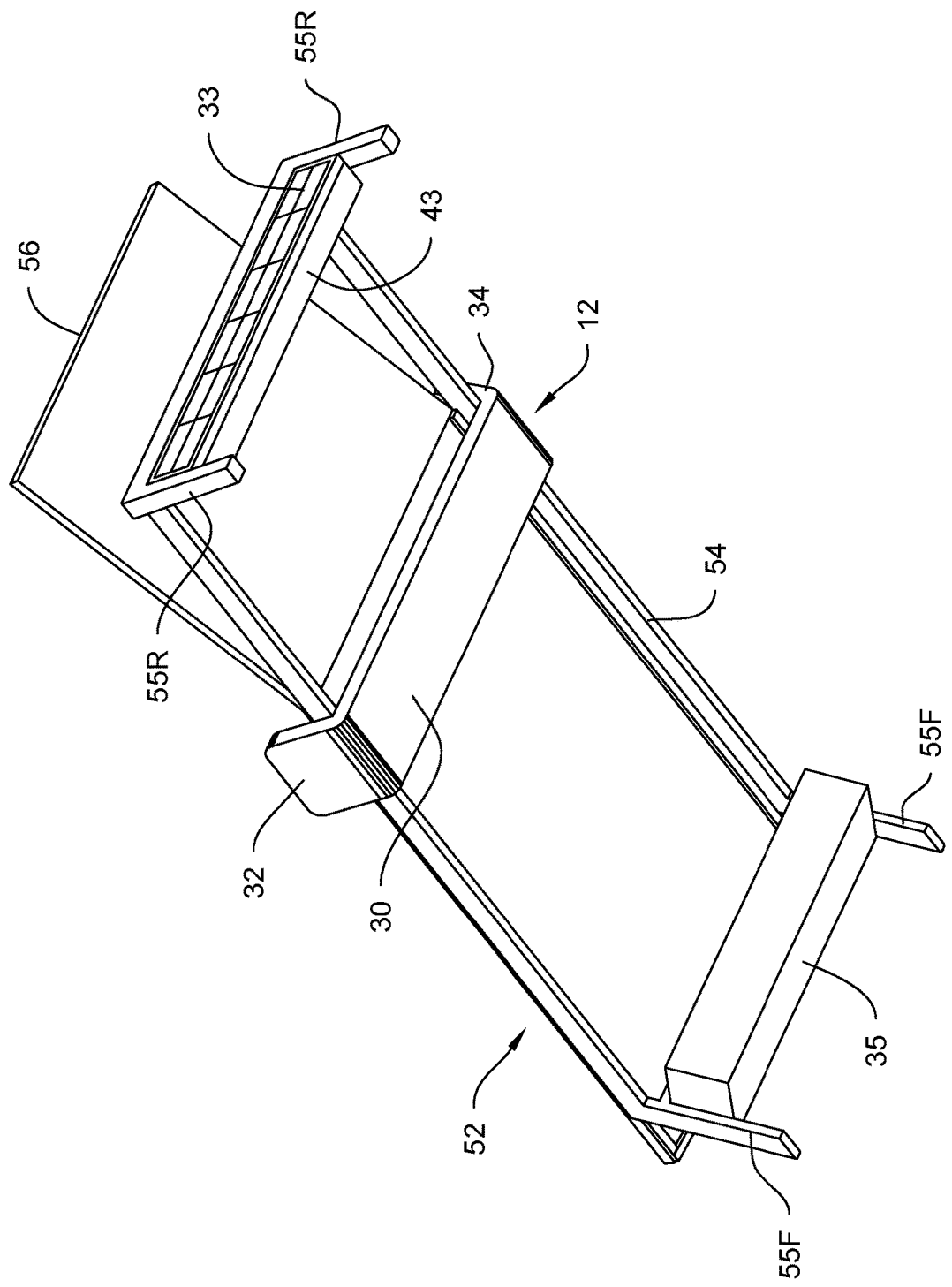
FIG. 3 is a bottom perspective view of the band system of FIG. 1 installed on a lounge chair according to a preferred embodiment of the invention.
Figure 4:
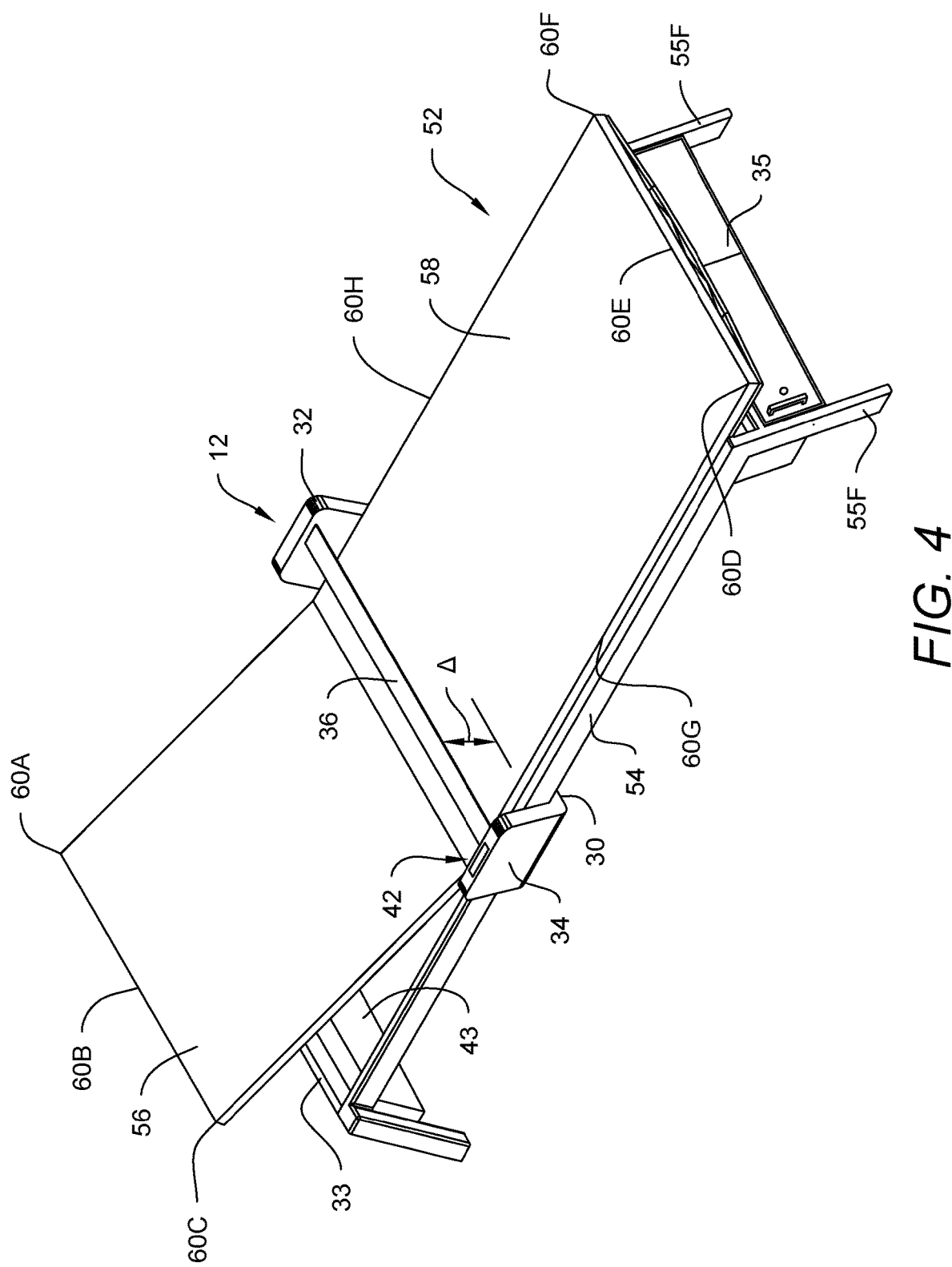
FIG. 4 is a top perspective view of the band system of FIG. 1 installed on the lounge chair of FIG. 3.
Figure 6:
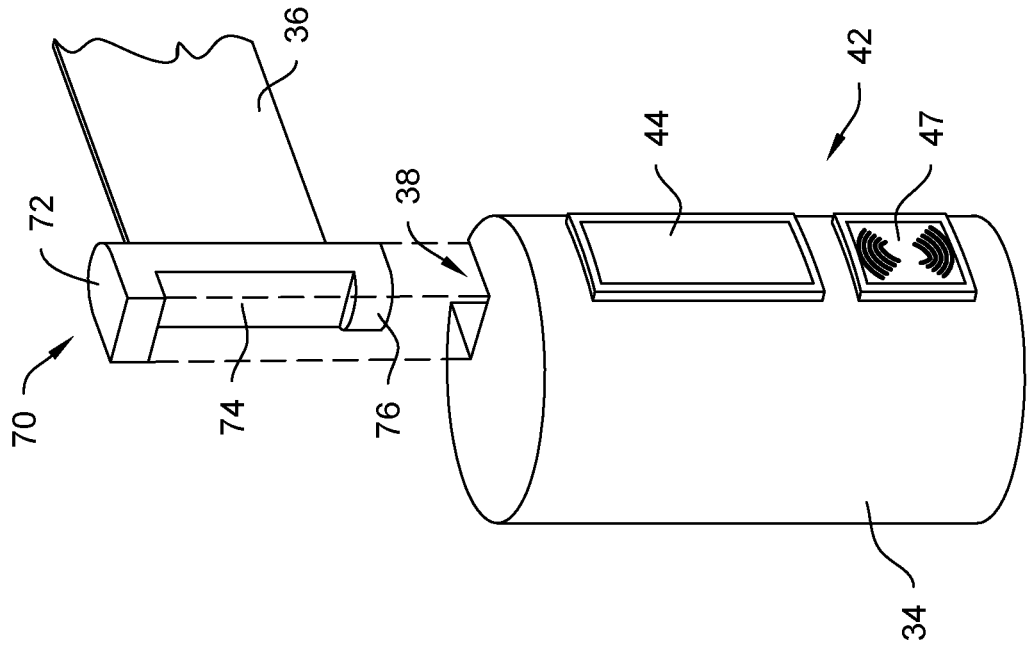
FIG. 6 is a rotated view of the body and user interface of FIG. 5.
Figure 5:
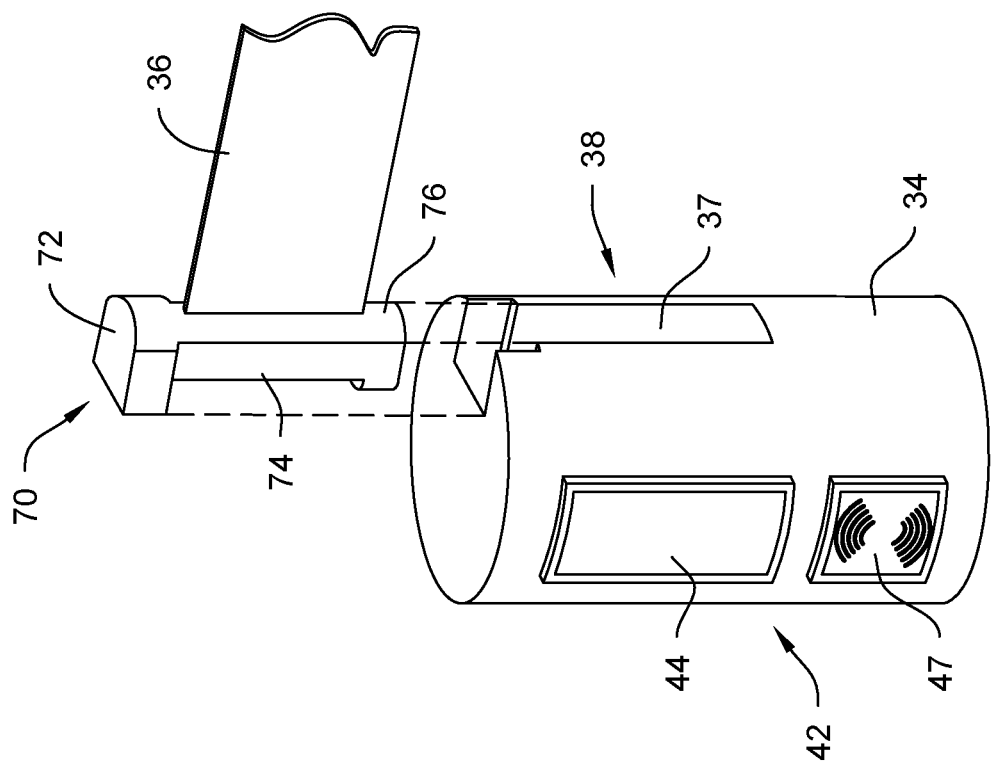
FIG. 5 is a front perspective view of an alternative preferred embodiment of a body and user interface for the band system of FIG. 2.
Figure 7:
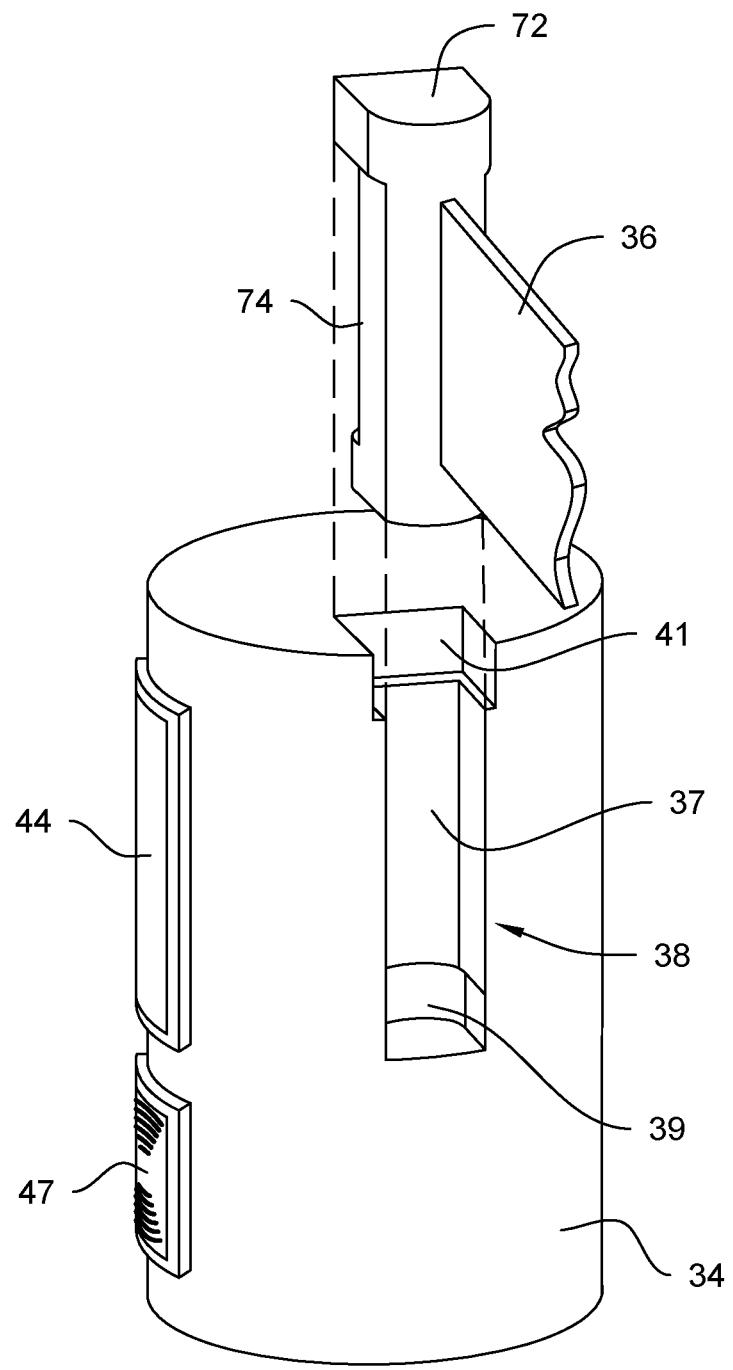
FIG. 7 is another rotated view of the body and user interface of FIG. 5.

According to other preferred embodiments, different configurations may be used for band 36 relative to seating surface 58 or an entry to an area 152 and any number of bands may be used. For example, two bands 36 may be used and disposed in a plus sign or "t" shape configuration with one band 36 disposed across seating surface 58 or between posts 132,134 in a widthwise direction (as shown in FIGS. 2 and 4, or in similar locations for entry 154 if optional posts 132,134 are not used) and a second band disposed across seating surface 58 or entry 152 in a lengthwise direction, preferably in a central portion of seating surface 58 (such as between points 60B and 60E) or a central portion of entry 152 (such as between points 160B and 160E). In another preferred configuration, two bands 36 may be disposed across seating surface 58 or entry 152 in an X shape, with one band disposed between points 60A and 60D (or 160A and 160D) and the other band disposed between points 60C and 60F (or 160C and 160E), for example. Additionally, two or more bands may be disposed horizontally across seating surface 58 (such as one band at a location of band 36 shown in FIG. 4 and a second band between points 60H and 60G) or across entry 152 (such as one band at a location of band 36 shown in FIG. 2 on posts or a similar position at points 160G and 160H and a second band between points 160G' and 160H'). Any number of band configurations may be used, with corresponding locations for bodies 32, 34 (and multiple sets of bodies 32, 34), and optional bases 30 and optional posts 132,134, as will be understood by those of ordinary skill in the art.

In these preferred embodiments, when the band is extended across the seating surface of the chair or across an entry to a venue area, the band provides a visual indicator that the chair or area is available for rental (for first-come-first-served systems) or may be available for rental (subject to prior reservations for systems that allow reservations to be made in advance of a use time or a user arriving at venue), but the band also indicates that a user should not sit in the chair or enter the area without first paying for a rental.

Band system 12 preferably further comprises one or more sensors configured detect tampering with band system 12 or unauthorized use of or access to a chair 52 or an area or entry 152 and/or to detect whether band 36 is in a closed position (with connector 70 connected to receptacle 38) or an open position (when connector 70 is not connected to receptacle 38 and band 36 is retracted around the spool 40). According to one preferred embodiment, a sensor is configured to sense or detect movement of the band 36, spool 40, or connector 70 or pressure on a connector 70, connector receptacle 38, or spool 40 while the band is still connected to the connector receptacle. If an unauthorized user attempts to bypass the band to access the chair or venue area, such as by sitting on the band, leaning against the band, pulling on the band, ducking under the band, or stepping over the band, the sensor will detect the movement or pressure. Preferably at least one sensor is configured to detect when connector 70 is connected to or engaged with receptacle 38 and/or when there is movement of the band 36 relative to spool 40. Any type of sensors may be used. For example, the tamper sensors may be internally contained magnetic reed switches having a magnet connected to the spool 40 and a fixed reed switch disposed near spool 40 within body 32 that detects movement of the magnet from a predetermined resting position. In setup of band system 12, an installer pulls the band across the rental space (an area entry, between posts 132, 134 or across a seating surface, between bodies 32, 34), wherein the band 36 is fully extended with connector 70 connected to or engaged with receptacle 38 without any slack in band 36 or external pressure on band 36 (such as by pulling or pushing on the band), then fixes the location of the magnet on the spool 40 in its resting position such that it is in direct proximity to the fixed, non-mobile reed switch within body 32. When the magnet is moved from this predetermined resting position, such as when an unauthorized user pulls on band 36, cuts the band, or sits on the band, the reed switch detects that the magnet is no longer in its resting position and can trigger an alert cycle or an alarm. Similar magnetic reed switches may be used between connector 70 and receptacle 38. Other types of reed switches or mechanical latch detectors may also be used to detect tampering with or unauthorized access of band system 12. Most preferably, any sensors are waterproofed within body 32, 34, such as through use of rubber seals as needed, to prevent corrosion, particularly in salt water environments in which band system 12 may be used. Each of the one or more sensors is preferably configured to send data or signals to a controller via wired or wireless communication so that controller can determine whether the detected movement or pressure is tampering or attempted unauthorized use or is an authorized user, based on whether or not a reservation has been made and/or a rental payment received for the chair or area for the current time or time slot. If tampering or unauthorized use is detected, the controller preferably initiates an alert. If a wired connection is used between the controller and the sensor, most preferably controller and the sensor are both disposed inside body 32 or both inside body 34.

According to one preferred embodiment, an alert is an audible or visual (such as a flashing light) alarm to let a user, employees of the venue, and/or an operator of reservation system 10 or 310 know there is tampering or unauthorized use. Vibration may also be used as an alert. Most preferably, an audible alarm will sound until the user stops moving band 36, spool 40, or connector 70 and/or releases pressure on band 36, spool 40, or connector 70. A visual alert is also preferably provided on a user interface 42 for controller, such as a display screen 44 disposed on second body 34. This allows an unknowing user to read information on the display screen 44 indicating that the chair or area must be rented before it can be accessed and whether the chair or area is available for rental for the current or an upcoming time slot. According to another preferred embodiment, an alert is a signal sent from controller via wired or wireless communication to a monitoring system 18, a computing device of the venue 22 (which may be part of monitoring system 18), a computing device 27 of an operator of system 10 or 310 and/or an employee of the venue, such as via text message sent to the employee's cell phone, as further described in FIGS. 10-16. This alerts the employee or other operator of reservation system 10 or 310 of potential tampering or unauthorized use so the employee or operator can address the situation. Most preferably, an alert continues until tampering or unauthorized use is no longer detected.

According to one preferred embodiment, a user interface 42 comprises a keypad 46 and/or a scanner or reader 47 to allow for payment for rental time or to activate a previously paid reservation via a credit card, hotel key, confirmation number, personal identification information associated with a user ID or a reservation, smart pay device, a QR code or a bar code on paper or a cell phone or tablet, or an RFID chip. Most preferably, the controller is configured to send and receive data or signals from one or more other devices, such as a monitoring system 18, a booking system 12, a user's computing device 20, and/or an ordering system 16 and to allow user inputs through user interface 42. When a rental has been paid, whether by an earlier reservation made through booking system 14 or by paying directly using the controller in band system 12, the controller preferably unlocks connector 70 from receptacle 38, allowing band 36 to be retracted around a spool 40 preferably disposed inside first body 32. When fully retracted, most preferably connector 70 remains fully or at least partially disposed outside body 32 to act as a handle to pull band 36 to reconnect it to receptacle 38 when a rental period ends. Although a simple timing mechanism may be used where controller automatically unlocks connector 70 at the beginning of a pre-paid rental time period, band system 12 preferably comprises a reservation confirmation step. Most preferably, band system 12 is configured so that any previously made reservations through booking system 14 must be confirmed with the controller at the time of use (at the beginning of or during a rental time slot), such as by entering a confirmation number, personal identification information associated with a reservation, swiping the credit card or hotel key used to make the reservation, or scanning a QR code, bar code, or RFID chip associated with the reservation or rental payment using user interface 42 to ensure the user releasing connector 70 from connector receptacle 38 is the person who paid for the rental. When a user pays for rental time using band system 12 at the time of desired use, without reserving the seating ahead of time, there is no need for a confirmation step.

According to another preferred embodiment, band system 12 comprises one or more solar panels 33 and/or a battery 43 and an optional locker or safe box 35. Controller is preferably supplied with power from solar panel(s) 33 and/or battery 43. When band system 12 is used with a chair 52, solar panels 33 and/or battery are preferably placed in a location that does not interfere with use of the chair 52 and that allows solar panels 33 to receive adequate sunlight. One preferred location for solar panel(s) 33 is between rear legs 55R of a chair 52, preferably with a bottom portion of the solar panel(s) angled slightly away from chair 52. A battery 43 may be disposed near solar panels 33, preferably under chair 52. An optional locker or safe box 35 is preferably disposed under chair 52, most preferably so that it is accessible from a side of a seating area 58 or a foot end of chair 52, such as between front legs 55F. Locker 35 is most preferably accessible via a code that is entered through user interface 42 and controlled by controller to lock and unlock the box during a rental period. The code may be selected by the user or by the controller or booking system 14. Alternatively, a credit card or hotel key associated with the reservation or rental payment may be used to access the locker 35 during a rental period. A secondary user interface may also be located on locker 35 to control access to the locker, but access is preferably controlled through user interface 42 or the secondary user interface is tied to user interface 42 and system 10 so that use of a locker 35 is only permitted by the person renting a chair/area during an authorized rental period. When band system 12 is used with an area, solar panels and/or a battery may not be needed as the area may have an accessible power outlet; however, solar panels and/or battery may still be used. Any solar panels 33, battery 43, and/or locker 35 may be placed near or attached to posts 132, 134 or on a wall or doorway frame for the entry to the area 152.

A reservation or rental may be for a selected period of time (such as 1 hour, 1.5 hours, 2 hours, etc.) or may be an open-ended period of time until the user elects to vacate the chair or area. When a user is done using the chair or area, the user simply reconnects connector 70 to receptacle 38 and leaves the chair or area. If the rental was for a selected period of time and the connector 70 has not been reconnected to receptacle 38 at the end of the period, then the controller will initiate an alert, which will continue until the user connects connector 70 to receptacle 38 or pays for additional rental time (if available). If the rental was open-ended, the user continues to pay at a predetermined rate per time until the user connects connector 70 to receptacle 38 and vacates the chair or area.

Figure 8:
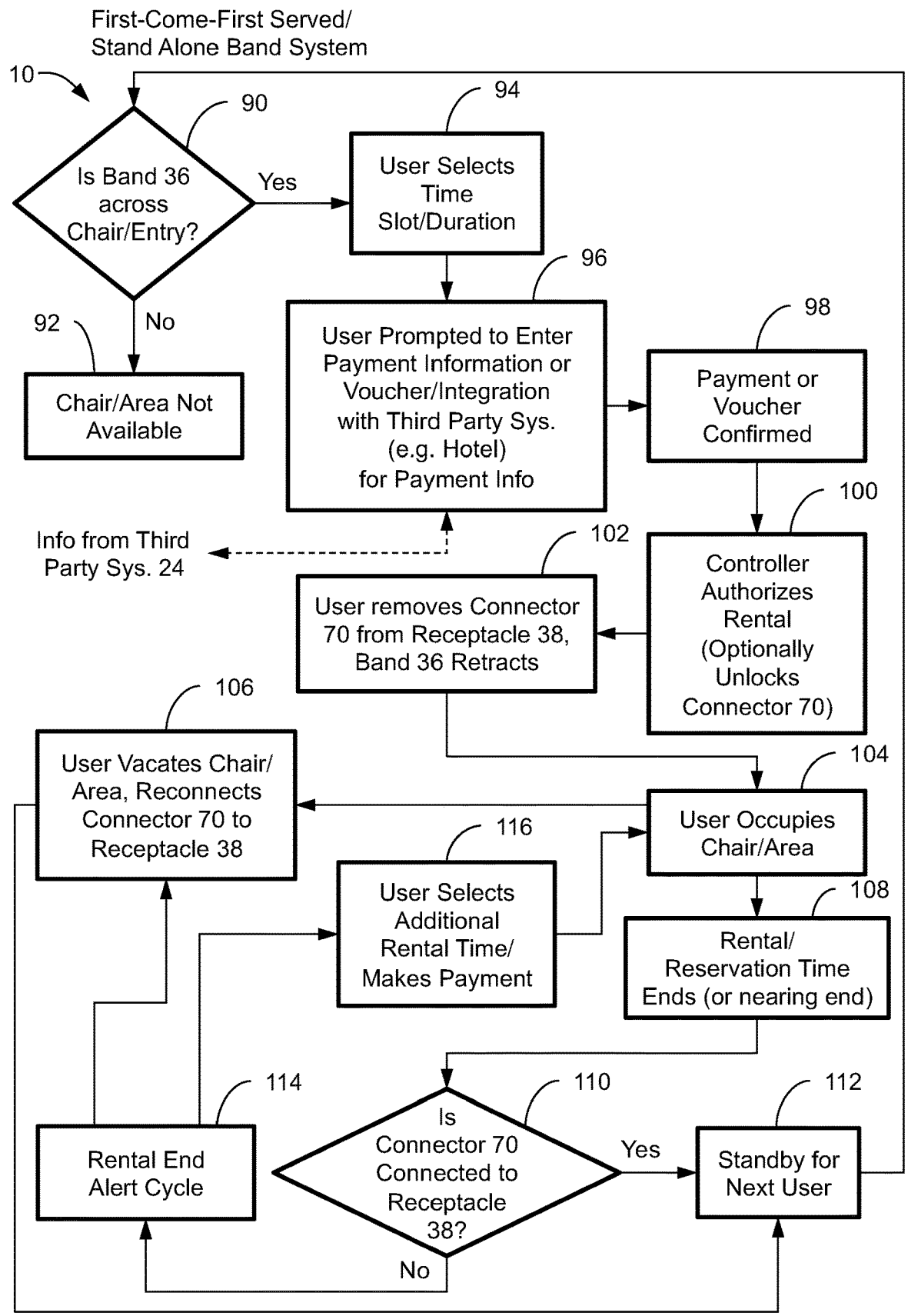
FIG. 8 is a flow chart showing preferred process steps for a reservation system and method used on a first-come-first-served rental basis according to one embodiment of the invention.
Figure 9:
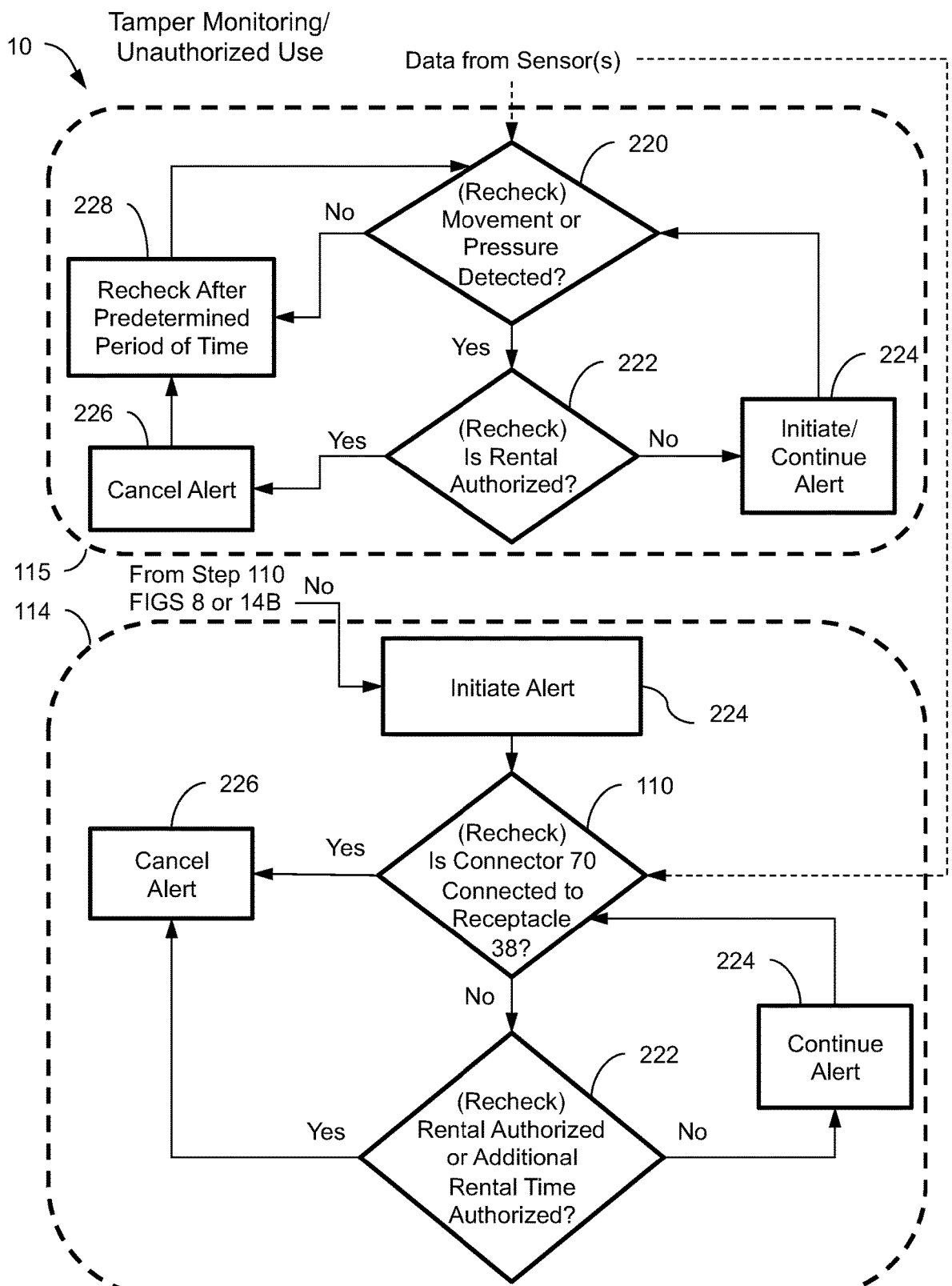
FIG. 9 is a flow chart showing additional preferred process steps for a reservation system and method according to one embodiment of the invention.
Figure 10:
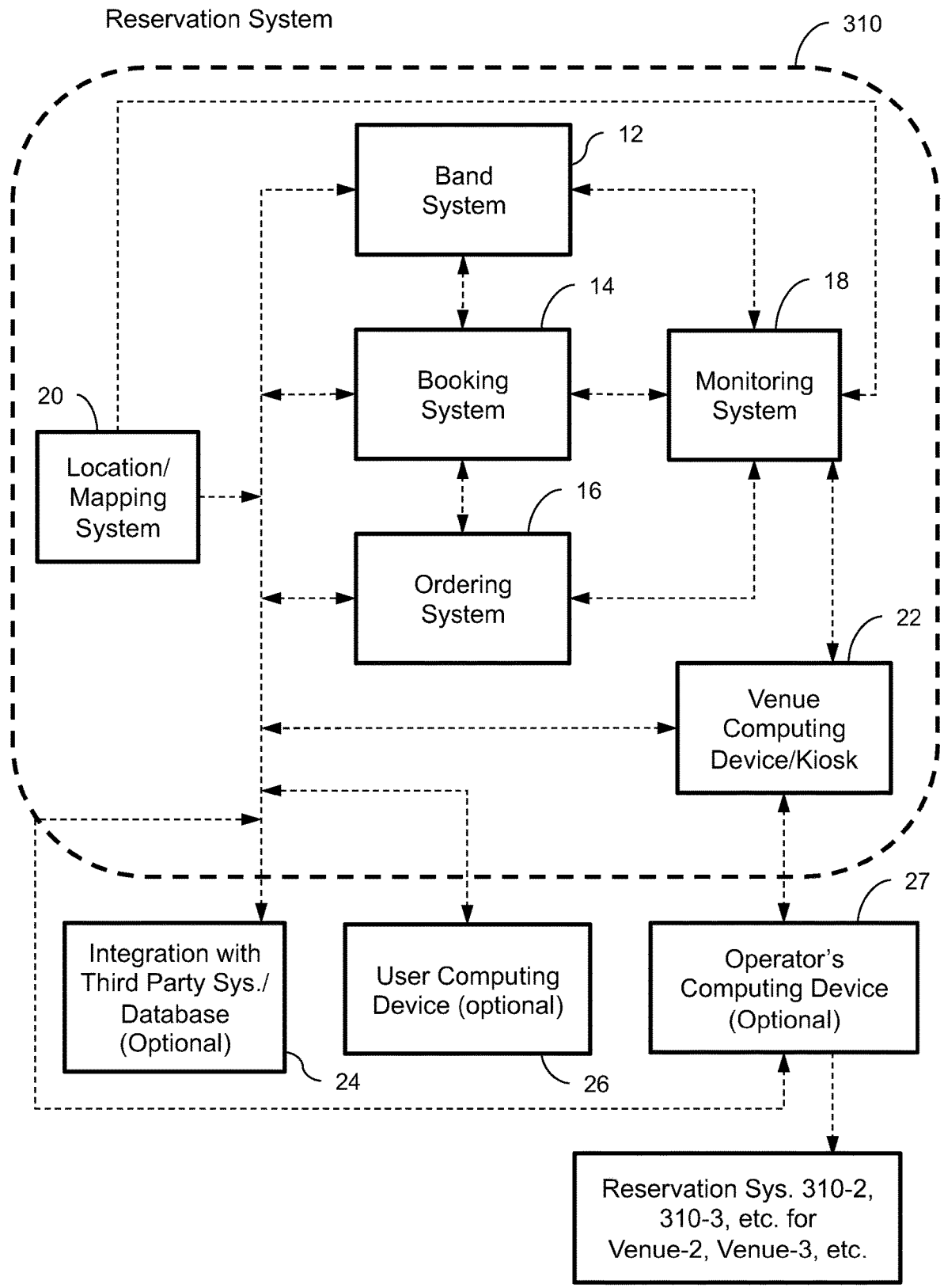
FIG. 10 is a flow chart showing process stages for another preferred embodiment of a seating reservation system and method of the invention.

Referring to FIGS. 8-9, a preferred embodiment of a reservation system 10 for rental of a chair or area in a venue by a user on a first-come-first-served basis is shown. This embodiment is for when a user is already at a venue and wants to rent a chair or area. When a user is ready to rent seating with reservation system 10, a user pays for rental time using user interface 42 of the band system 12 associated with the user's selected seating at the time of desired use, without reserving seating ahead of time. Although this embodiment does not allow a user to make a reservation for a chair or area ahead of time, system 10 may optionally allow a user to select an additional rental period at the end of a previous rental period to continuously occupy a chair or area over a longer period of time. Reservation system 10 preferably consists of a stand-alone band system 12 for each rentable chair or area, with each band system 12 having all necessary components for carrying out the method steps in FIGS. 8-9. Alternatively, reservation system 10 may comprise a band system 12 and one or more other sub-systems or computing devices (separate from a controller in band system 12) described herein for system 310.

As shown in FIG. 8, when a user arrives at a venue, the user visually inspects the chairs and/or areas to determine a desired location. A user visually determines at step 90 which chairs and/or areas have bands 36 across the chair or entry. If the band 36 is not across a chair or entry to an area, this indicates to a user that the chair or area is not available at step 92. If the band 36 is across a chair or entry to an area then this indicates to a user that the chair or area is available and the user selects a desired available chair or area.

At step 94, the user selects a desired rental duration (e.g. 30 minutes, 60 minutes, 90 minutes, etc.) or time slot (preferably from the current time, such as current time to 30 minutes from current time or current time to 60 minutes from current time), preferably via user interface 42 on band system 12. The duration of a rental may be pre-set to any desired variable length by the venue or operator, such as hourly or half hourly blocks or an entire day, and those options may be displayed to the user for selection at step 94. Minimum and/or maximum rental times may be pre-set by the venue or operator if desired, for particular chairs/areas or all chairs/areas in a venue. For example, chairs in a premium location or certain areas of a venue may have a pre-determined minimum initial rental period (such as 3 hours or all day) or a predetermined maximum initial rental period (such as 3 hours), and other chairs/areas may have the same or different minimum and/or maximum initial rental periods. Step 94 is optional if only one rental duration is available, such as a two hour period. Most preferably, multiple time slots or durations are available, such as 30 minutes, 1 hour, 2 hours, etc., for the user to select at step 94. At step 96, the user is prompted to enter payment information, such as by entering a credit card number using a keypad 46 on user interface 42, swiping or scanning a credit card for payment or a hotel key card to charge rental payment to the user's room. Other forms of payment may also be used, such as digital wallet platforms or a voucher, and entered through user interface 42. Alternatively, payment information may be retrieved from a third party system or computing device 24, such as a hotel system comprising the user's credit card information. A user may optionally be prompted to create or enter a login and save payment information for future use to avoid having to re-enter payment information if the user will be making a rental on multiple days. Payment (or a voucher) is confirmed and a rental is authorized at step 98. Connector 70 is preferably, but optionally, locked into receptacle 38 by a lock (such as a magnetic lock) that physically prevents connector 70 from being removed from receptacle 38 without being unlocked (or disabled) upon an authorized rental by controller at step 100. Most preferably, a mechanical or magnetic solenoid controlled lock is used. If a lock is used, then a controller on band system 12 unlocks or releases connector 70 at step 100 after the rental is authorized. A user then removes connector 70 from receptacle 38 and band 36 retracts at step 102 and the user occupies the chair or area at step 104. A tamper detection cycle 115 may be used to initiate an alert as described below if a sensor detects connector 70 has been removed from receptacle 38 without an authorized rental, particularly if a lock is not used.

A user may vacate the chair or area at any time prior to the end of the rental period by simply reconnecting connector 70 to receptacle 38 at step 106, in which case the chair or area becomes available for another user to use, returning to step 90. Most preferably, when connector 70 is reconnected to receptacle 38, a signal is sent to the controller to indicate a user has vacated the chair or area prior to the end of a rental period, which puts the controller in a standby mode at step 112 waiting for the next user. A refund may optionally be given of any unused rental period if a user vacates the chair or area before the end of a rental period. A timer within a controller for band system 12 (or in one of the other sub-systems, such as booking system 14 or monitoring system 18, if used together) determines when a rental period ends at step 108 and triggers the controller to determine if connector 70 is reconnected to receptacle 38 at step 110. If connector 70 is reconnected to receptacle 38, then the user has vacated the chair or area and the controller goes into a standby mode for the next user at step 112. Alternatively, a controller for band system 12 may periodically check to see if connector 70 is reconnected to receptacle 38 to go into standby mode at step 112 prior to the end of a rental period. If connector 70 is not reconnected to receptacle 38 at the end of the rental period then controller preferably initiates a rental end alert cycle at step 114. The user may then vacate the chair and reconnector connector 70 to receptacle 38 at step 106 or the user may select an additional rental period or time slot at step 116. If additional rental time is selected, the user then continues to occupy the chair or area and the process repeats until the user has vacated the chair or area, making it available for the next user. Additional rental time added at step 116 may also have pre-determined minimum or maximum periods that may be the same as or different from the minimum or maximum on an initial rental period at step 94. The minimum and/or maximum additional rental periods may also vary by chair/area location within a venue. In addition to or as an alternative to checking if connector 70 is connected to receptacle 38, step 110 may comprise checking any available sensor on band system 12 to determine whether or not a chair or area is still in use by a user at or near an end of a rental period. For example, a magnetic reed switch on spool 40 and in body 32 may be checked at step 110 to determine if the magnet is in its predetermined resting position (in which band 36 is extended across the chair or entry to the area). If yes, then the user has vacated the chair or area and the controller goes into a standby mode for the next user at step 112, system 12 stands by for the next user at step 112. If no, then controller preferably initiates a rental end alert cycle at step 114.

Referring to FIG. 9, reservation system and method 10 also preferably comprise a tampering cycle 115 to detect tampering with band system 12 and an rental end alert cycle 114 to signal the end (or near end) of a rental period. In tampering or unauthorized use detection cycle 115, data from one or more sensors is preferably checked at step 220 to determine if there is movement or pressure detected, indicating tampering or unauthorized use. If movement or pressure is detected, then band system 12 checks to see if a rental is currently authorized at step 222. If a rental is not authorized, then band system 12 initiates an alert at step 224. After a predetermined period of time (such as 30 seconds or 60 seconds), band system 12 rechecks to see if movement or pressure is still detected at step 220 and, if yes, then rechecks rental status at step 222. If there is still no authorized rental, the alert continues and band system 12 cycles through rechecking until either pressure or movement is no longer detected or a rental is authorized. If a rental is authorized at 222 or no pressure or movement is detected at step 220 (either initially or upon rechecking), then any alert issued is canceled at step 226 and band system 12 will periodically recheck the sensor status or retrieve data or signals from the one or more sensors at step 228 and repeat the process. As an alternative to or in addition to detection of movement or pressure, detection of whether the band 36 is in an opened or closed position may also be used in tamper cycle 115. Additionally tamper cycle 115 may be configured to only check for movement or pressure (or open or closed position) when there is no current rental period (or reservation for system 310), to avoid unnecessary status checks while the seating is being used by an authorized user. Additionally, sensors to detect tampering or unauthorized use and/or an alert/alarm may be automatically disabled during an authorized rental period to avoid unnecessary alerts/alarms. Most preferably, a venue employee or an operator may also send a signal to band system 12 to disable an alert/alarm for a particular chair or area, even if an alert has not yet been initiated for that chair or area (to pre-emptively disable an alert) or after an alert has been initiated and even if the cause of the alert has not been resolved (such as when the chair is still occupied by an unauthorized user). Additionally, band system 12 may be set up to automatically disable an alert after a predetermined period of time even if the cause of the alert is not yet resolved. Manual or automatic disabling of an alert avoids continued disruption of nearby authorized users and other patrons and employees of the venue. A rental end alert cycle 114 preferably comprises initiating an alert at step 224 if band system 12 determines that connector 70 is not connected to receptacle 38 at step 110 at the end or near the end of a rental period (indicating the seating is still in use). Again, step 110 may comprise checking any available sensor on band system 12, such as a magnetic reed switch on spool 40 and in body 32 to determine if the chair/area is still in use at or near the end of a rental period. Once an alert is initiated at step 224 in rental end alert cycle 114, band system 12 rechecks the connector 70 status after a predetermined period of time (most preferably at around 60 seconds, but other periods such as 30 seconds or 90 seconds may be used) at step 110. If the connector 70 is connected to receptacle 38 (or the magnet and reed switch on spool 40 and in body 32 are aligned) at step 110, then the alert is canceled at step 226. If it is not connected, then band system 12 rechecks rental authorization status after a predetermined period of time (most preferably at around 60 seconds, but other periods such as 30 seconds or 90 seconds may be used) at step 222. If a rental or additional rental time (from step 116) is authorized, then the alert is canceled at step 226, otherwise the alert continues at step 224. After another predetermined period of time (most preferably at around 60 seconds, but other periods such as 30 seconds or 90 seconds may be used), band system 12 repeats the cycle of checking the connector status and rental authorization status until the alert is canceled. Data from one or more sensors that indicate seating is still in use after an alert is initiated at step 224, such as a pressure sensor or motion detector, may be used as an alternative to or in addition to connector status in rental end alert cycle 114.

In addition to initiating an rental end alert cycle 114 at the end of a rental/reservation time if the chair or area is still occupied, one or more additional end alert cycles 114 or levels of alerts initiated at step 224 may also be provided in advance of the end time. A pre-end alert 224 may be a brief warning to a user, such as an audible alarm, a text message sent to a user's phone, a flashing message on display screen 44, or a flashing light on band system 12, that an end to the rental/reservation time is nearing, preferably given around 15 minutes before the end time. One or more pre-end alerts may similarly be given at other time periods, such as 5 minutes before the end time and may be the same type of alert (audible alarm, text message, or flashing light, for example) or the type of alert may escalate (be louder or a combination of two or more alert types) as the time period at which the pre-end alert is given gets closer to the end time. One or more pre-end alerts may give the user the option to select additional time at step 116 (if available). A final alert 224 is a longer alarm once the rental/reservation time is over, indicating that the user must vacate the chair or area or pay for additional time (if it is available). A final alert does not end until the connector 70 is reconnected to receptacle 38 (or the one or more sensors otherwise detect that the user has vacated the seating) or payment for additional rental time is made. A final alert may also escalate the longer the alert continues, such as by getting louder or combining two or more alert types. A final alert is preferably sent to an operator of system 10 or an employee of the venue (such as by email or text message, or to monitoring system 18 when used) so that venue employees may check on a user to provide assistance with payment for additional rental time, to assist with finding another available chair or area, or to ensure the user vacates the chair or area as needed.

Preferred embodiments of a method or system 310 for reserving seating in a venue, and sub-systems of system 310, are shown in FIGS. 10-16. Reservation system 310 may be used to reserve seating ahead of a rental period or ahead of a user's arrival at a venue and may, optionally, be used to rent seating (for immediate use) when a user is already at a venue (similar to system 10), subject to availability based on prior reservations. Reservation system 310 preferably comprises a plurality of band systems 12, a booking system 14, an ordering system 16, a monitoring system 18, a location/mapping system 20, and optionally a venue computing device/kiosk 22. Each sub-system 12, 14, 16, 18, 20, 22 is preferably configured to send and receive data and/or signals via wired or wireless communication to one or more other sub-systems 12, 14, 16, 18, 20, 22. One or more of sub-systems 12, 14, 16, 18, 20, and/or 22 is preferably configured to send and receive data and/or signals via wired or wireless communication to one or more other computing devices or systems 24 (such as a hotel reservation or payment system or a restaurant system), 26 (a user's personal computing device, such as a cell phone, tablet, computer, or laptop), and/or 27 (an operator's computing device). Each band system 12 is associated with a chair or an area of a venue that may be rented by a user. Software components configured to carry out one or more steps of preferred methods of the invention may be stored in a memory component for a band system 12 (such as a microprocessor in a controller for a band system 12), an operator's computing device 27 (such as for hosting multiple reservation systems 310-2, 310-3, etc. for multiple venues, such as venue-2, venue-3, etc.)), a venue computing device 22 (such as for hosting a reservation system 310 for a single venue), and/or a user's computing device 26. Venue computing device 22 may optionally comprise a kiosk or user accessible computing device that allows a user to make a reservation, confirm a reservation, and/or view available chairs or areas at the venue without having to use the user's personal computing device 26. Reservation system and method 310 also preferably comprises tampering cycle 115 and rental end alert cycle 114 as shown in FIG. 9.

Figure 11:
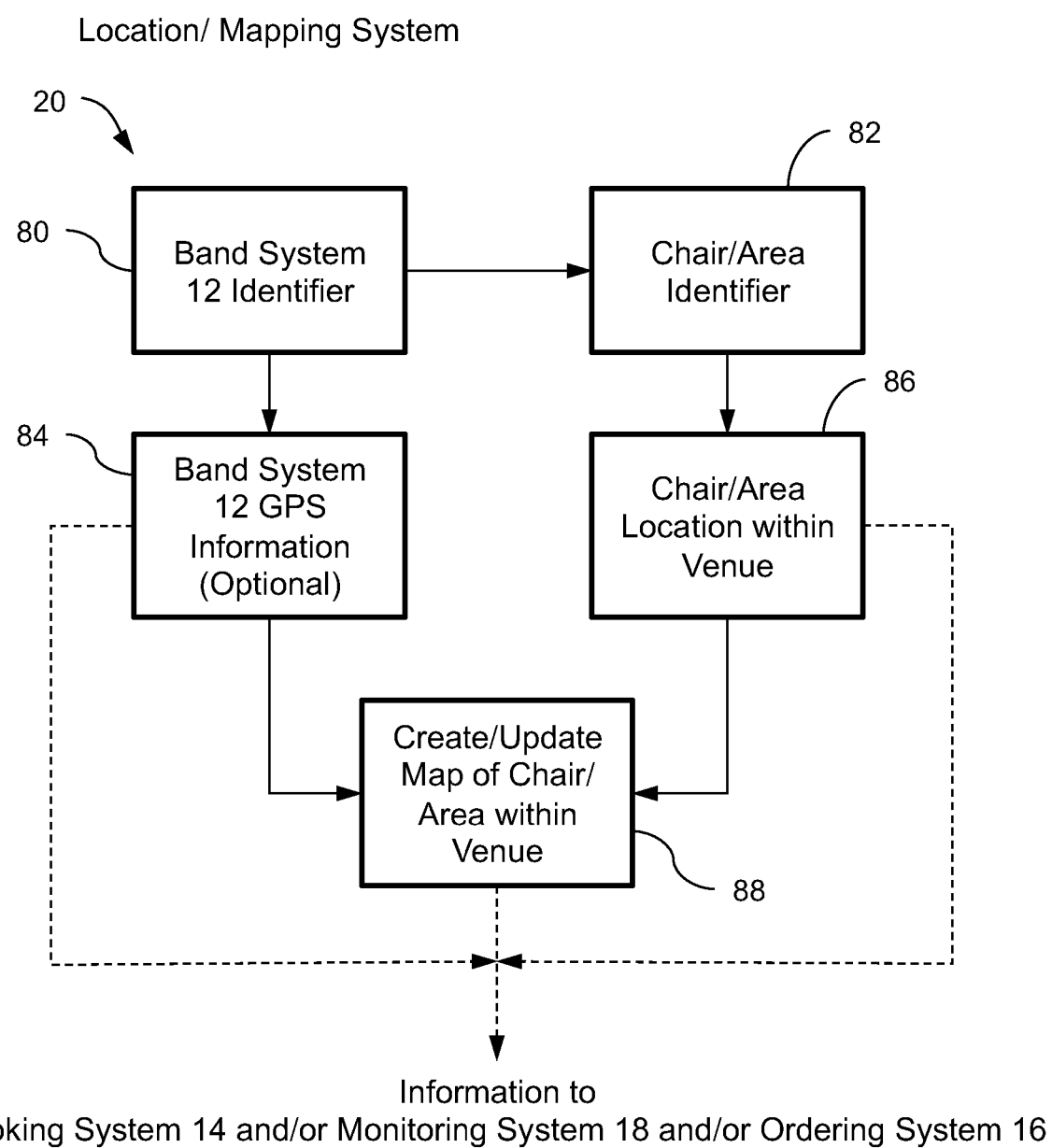
FIG. 11 is a flow chart showing preferred process steps for a location/mapping stage of the embodiment according to FIG. 10.

Referring to FIG. 11, a preferred embodiment of a location and mapping system and method 20 are shown. Most preferably, each band system 12 has a unique identifier 80 (such as an identification number) and each chair or area has a corresponding unique identifier 82, which are associated with each other. The identifier for the chair or area 82 may be the same identification number 80 as used with band system 12 or a different identifier that is associated with a particular band system 12 within reservation system 310. These identifiers may be used to locate a particular chair or area, and its corresponding band system 12, within a venue via a GPS device location 84 or a pre-determined, generally fixed location 86. The identifier allows a user to make a reservation for a particular chair or area, aids in locating a chair or area when there is an unauthorized use or tampering detecting and/or when a user wants to order goods or services via ordering system 16.

According to another preferred embodiment, band system 12 comprises a GPS device configured to send data or signals regarding a GPS location 84 of the particular band system 12 (and its associated chair or area) via wired or wireless connection to the controller for further communication to, and/or directly to, one or more sub-systems, such as booking system 14, monitoring system 18, and/or ordering system 16. This allows the specific GPS location of a particular band system 12 (and its associated chair or area) to be identifiable to these other systems as a way of locating the associated chair or area when a user is making a reservation through booking system 14, monitoring for tampering or unauthorized use in monitoring system 18, and/or when a user wants to order goods or services via ordering system 16. It also aids in identifying when a user is attempting to move a chair or moveable area (such as a table and chairs) from its designated location to another location, which may or may not be permitted by the venue. Most areas (such as a cabana) are not easily moveable by a user, so a GPS device is generally not needed with these areas. If a chair or moveable area (such as a table and chairs) is fixed in a particular location, such as being bolted to the ground, or if the chair or area is weighted to lessen the likelihood of unauthorized re-location, then specific GPS location data 84 is not needed, but may still optionally be used. Most preferably, if a GPS device is not used, each chair or area in a venue has a generally defined location 86 within the venue where the chair or area is located, relative to fixed elements of the venue (such as a bar, swimming pool, restroom, etc.), although there may be some variation in the exact location of such within the generally defined location.

Location and mapping system 20 preferably uses GPS data 84 and/or generally defined location data 86 to create and periodically update a map 88 of the venue showing the location of each reservable chair and/or area. Preferably map 88 comprises at least a two-dimensional top plan view of the venue showing chair and/or area locations relative to fixed venue locations, such as entry, exit, restrooms, bar, swimming pool, parking lot, trash receptacles, playground, children's areas, adult-only areas, shaded areas (or specifically trees, canopies, umbrellas), primarily sunny areas, and a general direction key (indicating north, south, east, and west directions). Most preferably, map 88 further comprises one or more 360° three-dimensional navigable videos or photos showing chair and/or area locations relative to such fixed venue locations. Maps 88 are preferably sent to one or more sub-systems 14, 18, and/or 16.

Figure 12:
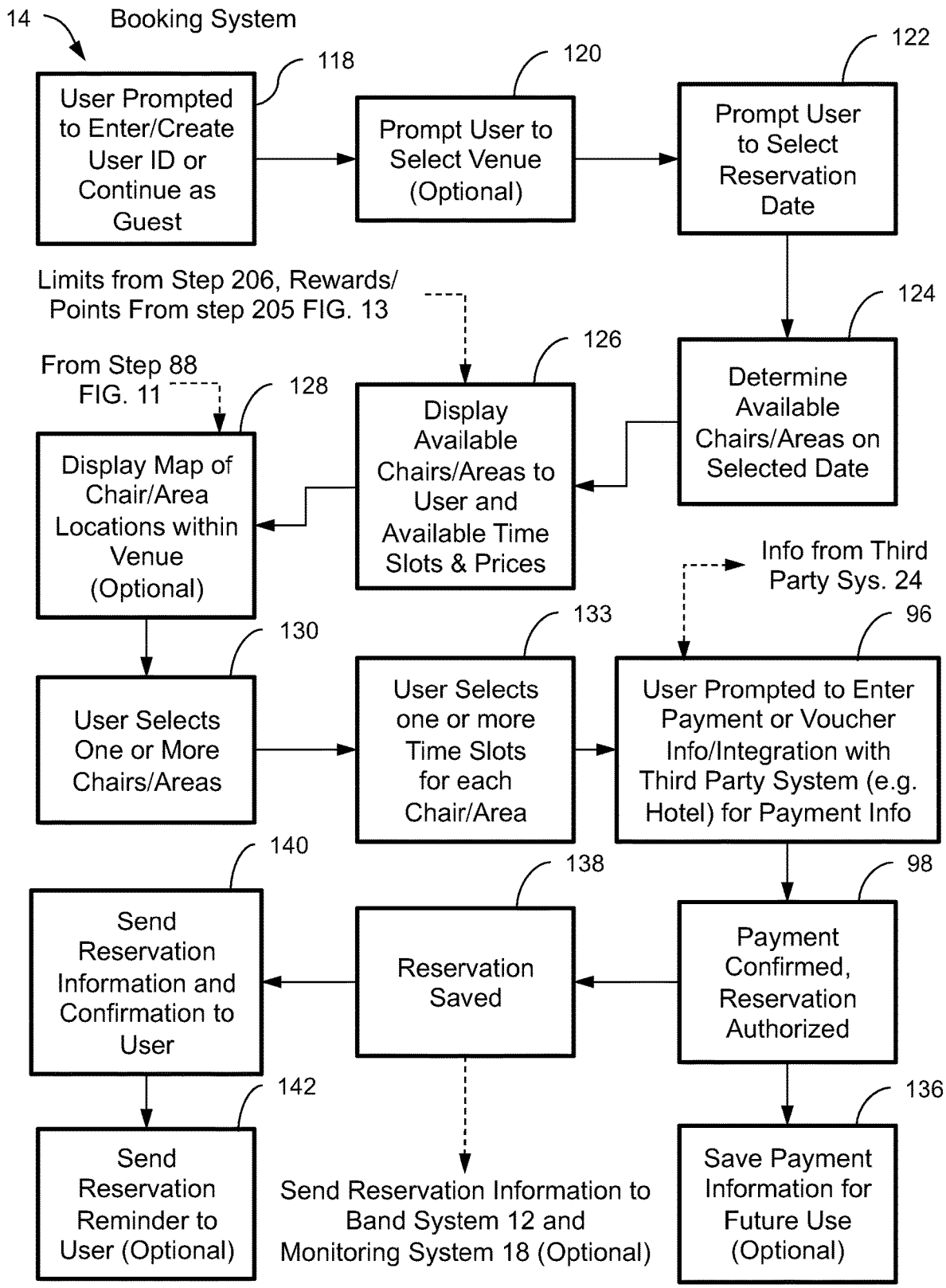
FIG. 12 is a flow chart showing preferred process steps for a booking stage of the embodiment according to FIG. 10.

Referring to FIG. 12, a preferred embodiment of a booking system and method 14 is shown. Prompts and data entry in booking system 14 may be made through a user's computing device 26, a venue computing device or kiosk 22, or through a user interface 42 on a band system 12. At step 118, a user is preferably prompted to enter/create a user ID and login information (password) or continue as a guest. If a user continues as a guest, the user may be re-prompted at a later point in the process (such as after making payment at step 135) to create a login so that payment information may be saved for later use at step 136. Even if continuing as a guest, a user may be required to enter basic identifying information, such as the user's name or a hotel room number (if the venue for which a reservation is being made is a hotel). If the venue is a hotel or private club, booking system 14 may confirm the user's identity matches an existing room reservation for the hotel or membership for the club and may optionally deny a reservation to a user that is not a hotel guest or club member or alert the hotel or club that a user without a room reservation or membership has reserved a chair and/or area at the hotel or club. A user is optionally prompted to select a venue at step 120. Reservation system 310 may be hosted by an operator on a website for use with multiple different venues, in which case a user would need to select the desired venue. In other embodiments, reservation system 310 may be for a single venue accessible via the venue's primary website, a unique website for reservation system 310, and/or an onsite venue computing device 26, in which case the user would not need to select a venue.

A user is prompted to select a reservation date at step 122. A reservation date may be the current date or a future date. Booking system 14 may optionally limit how far in the future from the current date a reservation may be made, such as only allowing reservations up to six months from the current date, for example. Based on prior reservations made and saved at step 138, booking system 14 then determines which chairs and/or areas are available on the selected date at step 124 and displays the available chairs and/or areas and available time slots to the user at step 126. The availability display at 126 may take on a simple list format, listing each chair and/or area by its identification number 82 (or corresponding band system identifier 80), along with available time slot(s) for each chair and/or area and optionally with descriptor information, such as proximity of each chair and/or area to points of interest within the venue or the location of other areas (such as restrooms, swimming pool, bar, etc.). More preferably, the availability information 126 is displayed along with a map 88 at step 128. Most preferably, map 88 displayed at step 128 is integrated with availability information, such as different coloring indicating different levels of availability, so that a user can easily see which chairs and/or areas are available (or have some availability) for the selected date. For example, chairs and/or areas that are available for the entirety of the venue's open hours on the selected date may be displayed in a first color (e.g. green), chairs and/or areas that have no availability on the selected date may be displayed in a second color (e.g. red), and chairs and/or areas that are available for a portion of the venue's open hours on the selected date may be displayed in a third color (e.g. yellow). Most preferably, such map 88 is interactive and allows a user to mouse over or point to a particular chair or area to see available times if the chair or area is only available for a portion of the venue's open hours on the selected data and to click on a chair or area to select it for a reservation at step 130. Other types of data entry may be used to select one or more chairs and/or areas for a reservation at step 130.

The user then selects one or more time slots for each chair and/or area at step 133. The user is then prompted to enter payment information at step 96, as previously described. As an additional alternative, a user may enter hotel room number information to charge rental payment to the user's room. If room number information is used to make a reservation, booking system 14 preferably confirms the name on the reservation matches the name associated with the hotel room through communication with a hotel reservation system 24. Payment is confirmed at step 98 and payment information may be optionally saved for future use at step 136. Booking system 14 then saves the reservation information at step 138 and reservation information is preferably sent to one or more other sub-systems, such as band system 12 and/or monitoring system 18. Reservation information is preferably only sent to such sub-systems the day of or the day before the reservation date. Reservation information and confirmation is provided or sent to the user at step 140. Reservation information preferably comprises written notice of the reservation details, including date, time slots, venue location, and chair identification number 82 (or band system identifier 80). Reservation confirmation also preferably comprises a confirmation number, a QR code, or a bar code corresponding to the particular reservation that may be used at step 151 when the user arrives at the chair or area to begin using the chair or area at the reserved time. Reservation confirmation may be downloaded to a user computing device 26 or sent to user via email, text message, or by a printed communication. Booking system 14 also preferably sends user a reminder of an upcoming reservation at step 142, via email, text message, or printed communication.

Figure 13:
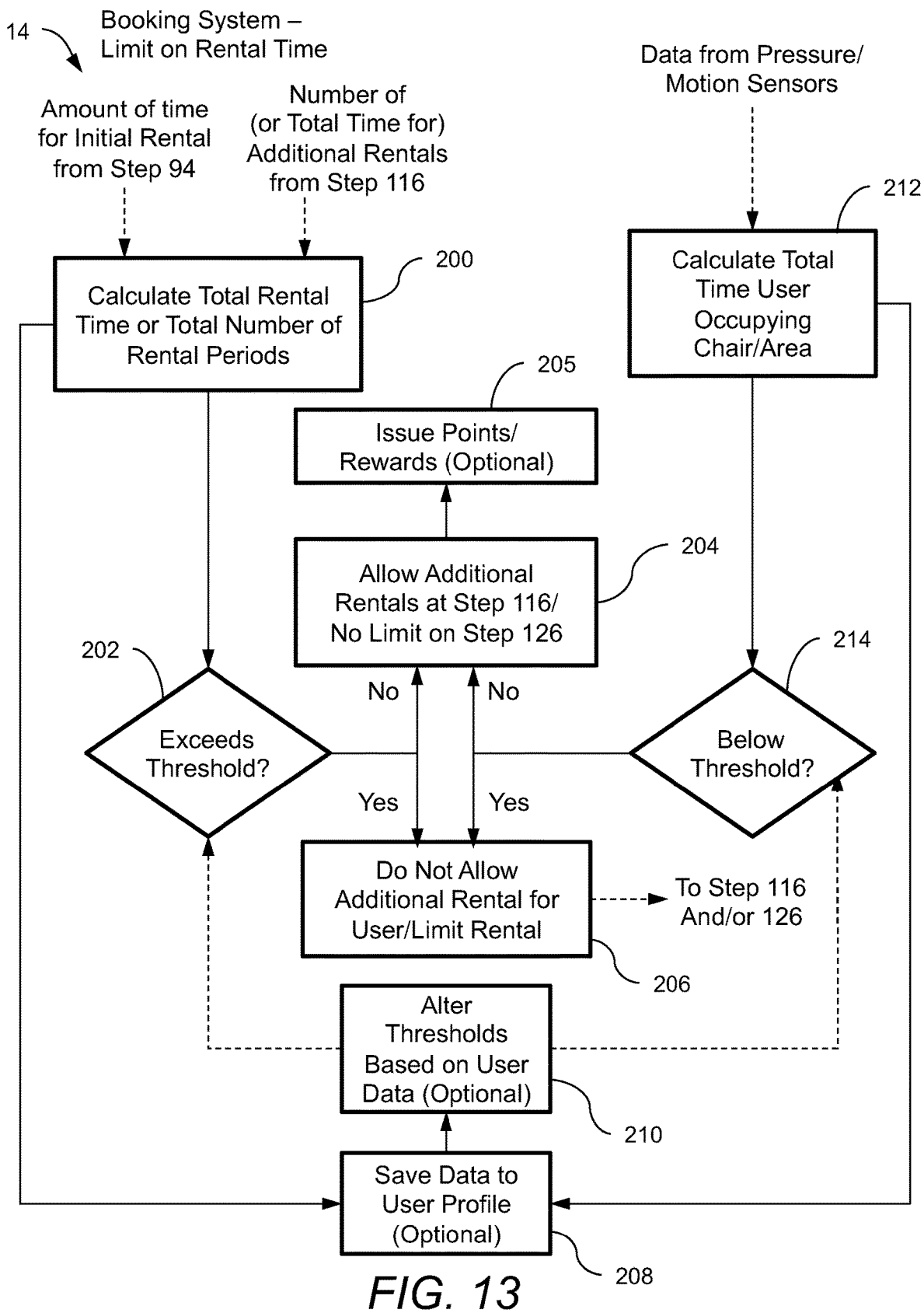
FIG. 13 is a flow chart showing optional preferred process steps for a booking stage of the embodiment according to FIG. 10

Referring to FIG. 13, booking system and method 14 optionally further comprises steps that may limit a user's ability to reserve or rent a chair or area based on the user's actual use of the chair or area. These limitations may be needed where there is high demand for chairs or areas at a venue but users are not actually using the chairs or areas that they have reserved or rented. The amount of time from an initial rental for a user from step 94 or 133 and the number of times the same user has added additional rental time at step 116 (or the total amount of additional rental time from step 116) are retrieved to calculate the total rental time or total number of rental periods (the initial rental at step 94 or 133 plus the number of additional rentals at step 116) at step 200 for a particular chair or area in a predetermined time period. Most preferably, the predetermined time period is one calendar day, but other time periods may also be used. The total from step 200 is compared to a predetermined threshold at step 202. The predetermined threshold may vary based on the time of year, overall occupancy rate for chairs and areas at the venue, day of the week, time of the day, or other variables. Additionally, multiple threshold values or levels may be established with varying degrees of limits set at step 206, as further discussed below.

Band system 12, chair 52, entry 152, and/or an area may be equipped with one or more sensors indicating whether a chair or area is being used. Such sensors may comprise a pressure sensor to detect when a user is sitting in a chair or walking across an entry or a motion sensor to detect movement at or in a chair or area. These sensors may be used to monitor how much time the user is actually occupying a rented/reserved chair or area. Data from these sensors may be sent via wired or wireless communications to booking system 14 (which may be part of a controller in a band system 12). Sensor data is used to calculate a total occupancy time at step 212. The total occupancy time is the number of minutes the sensors indicate the chair or area was being used by the user over a predetermined period of time. The predetermined period of time is preferably set to be less than the initial or any subsequently added rental period, so that occupancy may be determined periodically over a rental period, particularly for long rental periods (such as 12 hours or more). For any rental period less than a given threshold, such as 1 hour, steps 212 and 214 may optionally be omitted as desired. The calculated total occupancy time is then compared to a predetermined threshold at step 214. The predetermined threshold may be a number of minutes or a percentage of the current rental period. The predetermined threshold may vary based on the time of year, overall occupancy rate for chairs and areas at the venue, day of the week, time of the day, or other variables. Additionally, multiple threshold values or levels may be established with varying degrees of limits set at step 206, as further discussed below.

If the comparison shows the total does not exceed the threshold at step 202 or is not below the threshold at step 214, then step 204 will allow the user to add additional rental time at step 126 and no limits are placed on the user's future rentals at step 126. If the comparison shows the total exceeds the threshold at step 202 or is below the threshold at step 214, then system 14 may limit the user's ability to continue renting that particular chair or area for additional time on that calendar day and/or renting that particular chair or area or other seating for future reservations at step 206. The denial of additional time or other limit imposed is then sent to steps 116 to block or limit additional rental time for the same calendar day and/to step 126 to block or limit future reservations of the same or a different chair or area at the venue (or another venue) by the user. For example, for a four hour initial reservation, if step 212 shows a user has not occupied the chair at all within the first hour of the reservation period and/or has occupied the chair for less than 15 minutes in the first two hours of the reservation period at step 212, and if either or both are below the threshold(s) at step 214, then rules or limits are applied at step 206. The rules or limits applied may include, for example, denying the user the ability to add additional rental time at step 116 or limiting the maximum duration of a future rental at step 126 to a shorter period of time (such as 1 hour). Additionally, denying the user the ability to add additional rental time at step 116 may be triggered by occupancy of less than 15 minutes in the first two hours and limiting the maximum duration of a future rental at step 126 to a shorter period of time may be triggered by the none-use during the first hour, or vice-versa, as varying levels of limits based on different occupancy rates. As another example, if a user initially rents a chair (at step 126 or step 94) for three hours, then adds 30 minutes at step 116, then adds another 60 minutes at step 116, the total rental time would be 4.5 hours and the total number of rentals for that chair would be 3 at step 200, and if either or both exceed the threshold at step 202, then rules or limits are applied at step 206. The rules or limits applied may include denying the user the ability to add rental time again at step 116, limiting the next addition of rental time at step 116 to a shorter period of time (such as 30 minutes), or limiting the maximum duration of a future rental (at step 126 or 94) to a shorter period of time (such as 1 hour). To apply rules or limits on a user's future reservations or rental (non-contiguous reservations, such as those made on another day, as opposed to contiguous additions of time at step 116), booking system 14 preferably tracks and stores usage information at step 208, including totals from steps 200 and/or 212, for each user that has created and used a user ID at step 118. This data may be used at step 210 to alter the thresholds applied at steps 202 and/or 204 for a particular user. Alternatively, this data may be used to apply limits at step 206 for a particular user, which may differ from the generally applied limits or any limits applied to a different specific user. Any type or combination of limitations may be set and any combination of thresholds and rules or limits may be applied, as will be understood by those of ordinary skill in the art.

Alternatively or in addition to limits placed on a user, a user may also be rewarded for making reservations and/or having high occupancy rates. If the comparison shows the total does not exceed the threshold at step 202 or is not below the threshold at step 214, then step 205 may also provide the user with points or a reward. Alternatively, a reward or points may be awarded to a user if the comparison shows the total does exceed the threshold at step 202, but the occupancy rate is not below the threshold at step 214. Points and awards may also be given to users who use system 310 frequently, regardless of the comparisons at steps 202 or 214, particularly for venues that do not have issues with users not using the chairs or areas that they have reserved or rented. Points may be accumulated to a user's profile based on the user ID toward rewards. A reward may comprise addition rental time without charge, discounts on additional rental time or future reservations, discounts on ordered goods and/or services, free goods and/or services, or coupons for third party goods and/or services. Additionally, various rules may be applied to particular seating based on points values or levels. For example, users with point totals above a predetermined threshold may have access to premium seating in a venue, while those users below the threshold may not be given access to such seating in system 310. Any number of rules may be applied based on varying values of points.

Figure 14A:
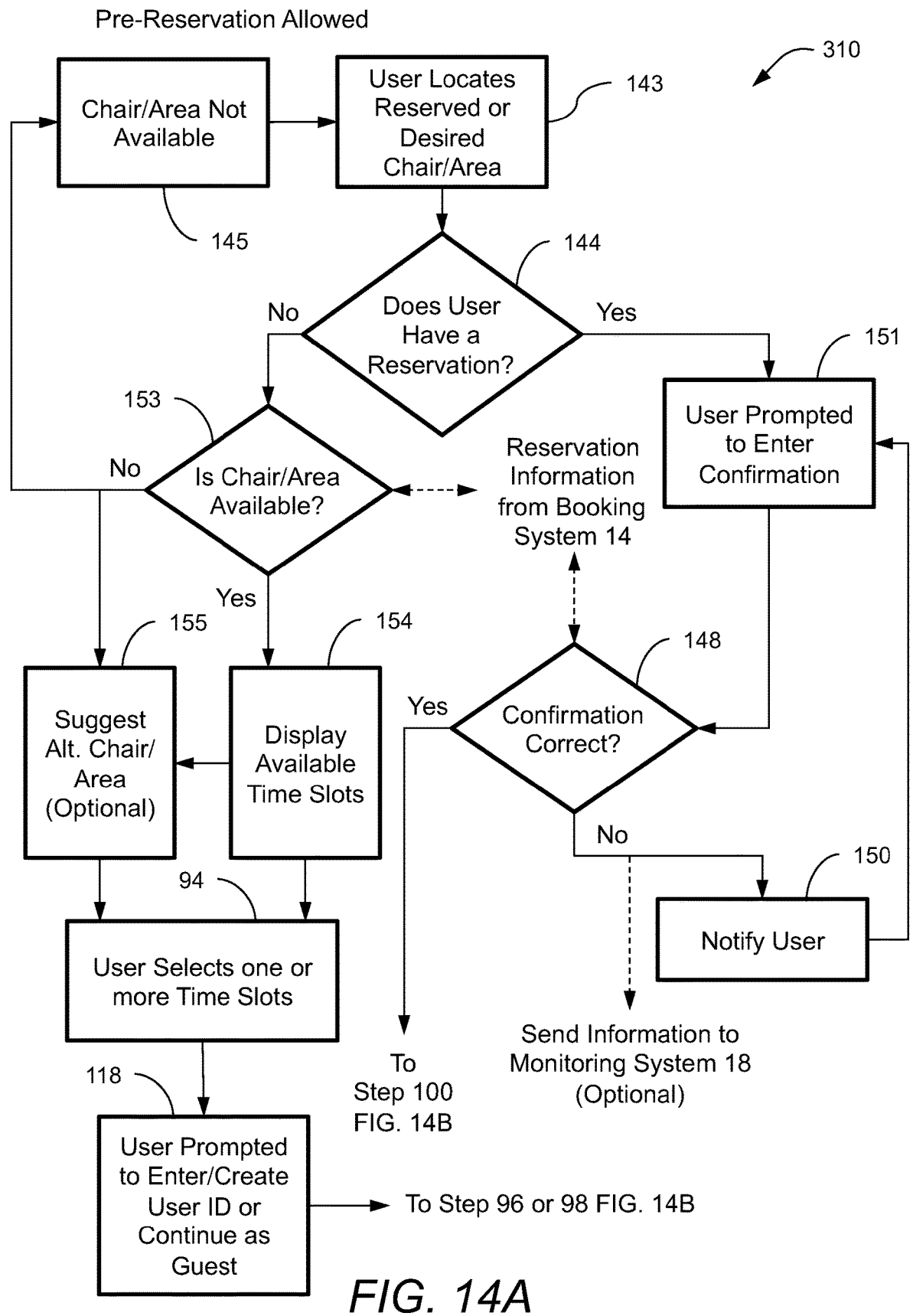
FIGS. 14A-14B are continuing flow charts showing preferred process steps for a reservation system and method allowing seating to be reserved prior to a user arriving at a venue.
Figure 14B:
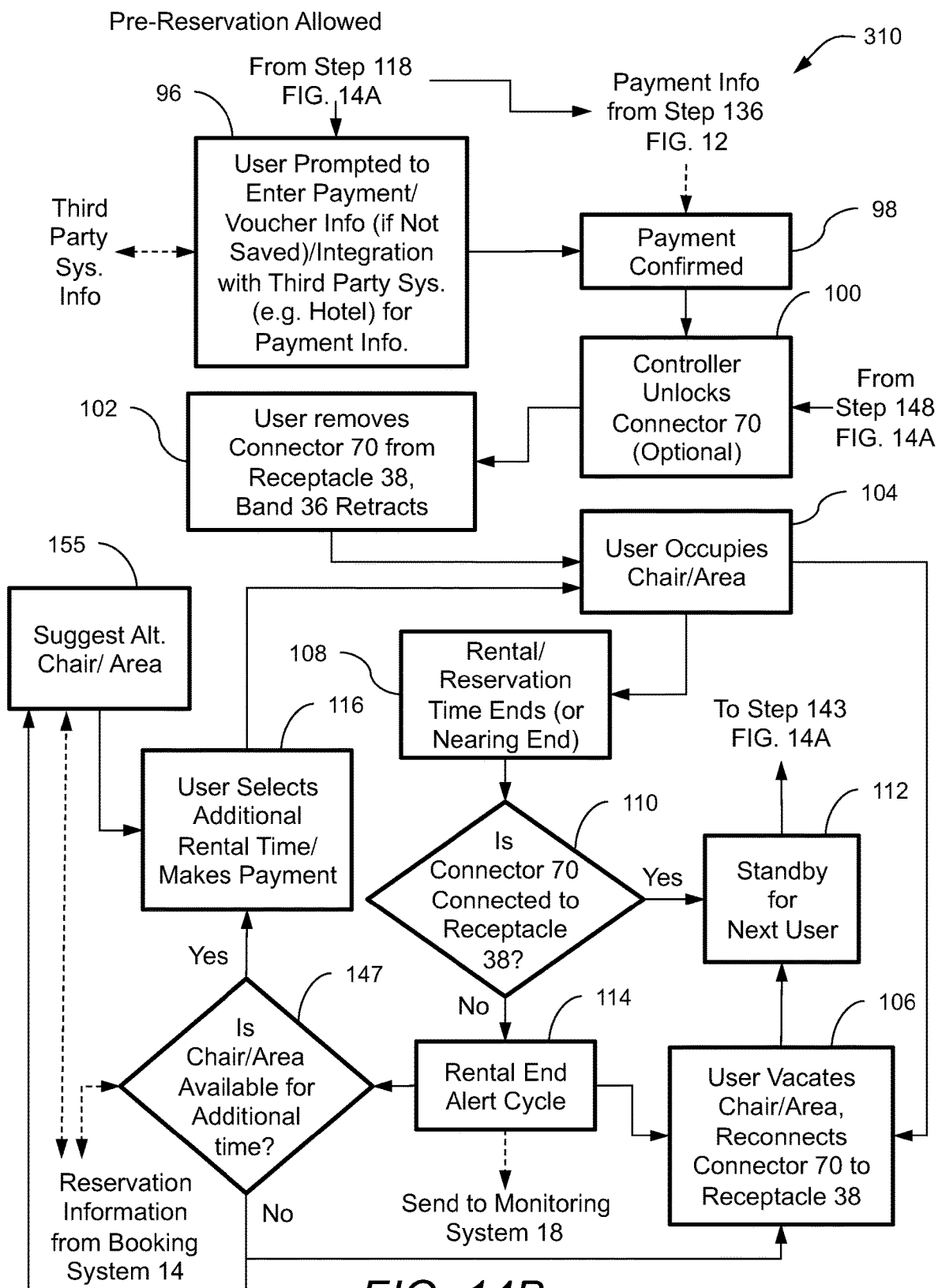

Referring to FIGS. 14A-14B, preferred steps in reservation system and method 310 for when a user arrives at a venue that accepts prior reservations is shown. Depending on the venue and limitations imposed in method and system 310, a user need not have made a prior reservation to rent a chair and/or area in a venue that accepts prior reservations, but will be able to use chairs and/or area subject to prior reservations by other users. When a user arrives at the venue, the user locates his/her reserved chair or area using the band system identifier 80 and/or chair/area identifier 82 provided when making the reservation at step 143. Alternatively, if a user does not have a prior reservation, a user locates one or more desired chair(s) and/or area(s) at step 143. If a user does not have a reservation, the user may visually determine which chairs and/or areas have bands 36 across the chair or entry. If the band 36 is not across a chair or entry to an area, this indicates to a user that the chair or area is not available and the user should look for a different chair or area. If the band 36 is across a chair or entry to an area, then this indicates to a user that the chair or area may be available, depending on prior reservations.

Preferably through user interface 42 on band system 12 for the reserved or desired chair or area, or through a venue computing device or kiosk 22 or through the user's personal computing device 26, the user is prompted to indicate if the user has a reservation at step 144. If the user does have a reservation, the user is prompted to enter reservation confirmation at step 151. Reservation confirmation may be entered by typing information associated with the reservation (such as user ID, confirmation number provided at step 140, telephone number, email, hotel room number, or credit card number), speaking such information into an audio device, scanning a QR code or bar code, scanning or swiping the credit card used to make the reservation or a hotel room key card associated with the reservation. The reservation confirmation is checked against the data in booking system 14 at step 148 to determine if the confirmation is correct. If the reservation confirmation is correct, the controller on band system 12 will unlock connector 70 from receptacle 38 at step 100, as previously described, and the user will occupy the chair or area at step 104. If the reservation confirmation is incorrect, the user is notified at step 150. The user may be prompted to re-enter the reservation confirmation, as there may have been an entry error. The reservation confirmation may not match if the user has the wrong chair or area, the wrong reservation time, or the wrong date. Such information may be conveyed to user at step 150. Most preferably, if reservation confirmation does not match, monitoring system 18 is notified so that a venue employee may provide assistance as needed.

If the user does not have a reservation when prompted at step 144, then booking system 14 determines if the selected chair or area is available at step 153 based on prior reservations saved at step 138. If the chair or area does not have any availability for a predetermined time period, such as for the remainder of the venue's open hours for the day or for the next five hours, for example, then the user is notified the chair or area is not available at step 145 and the user can locate a different desired chair or area at step 143 and repeat the process until the user finds a chair or area that is available. Most preferably, booking system 14 will suggest to the user other chairs or areas with availability at step 155, so the user does not have to repeat the process multiple times to find an available chair.

If the chair or area does have availability at step 153, the available rental period time slots are displayed to the user at step 154. The available rental period time slots are the time(s) from the current time until the venue's closing time if there are no reservations from step 138 between those times, from the current time until the beginning of the next subsequent reservation from step 138, and/or from the end of one or more future reservations (e.g. 3 p.m. for a first future reservation from step 138 at 1 p.m. for two hours) until the beginning of one or more other future reservations (e.g. 5 p.m. for a second future reservation from step 138 that begins at 5 p.m.) and/or the venue's closing time. One or more buffer periods, such as 15 or 30 minutes, may be built into booking system 14 to provide a gap between saved reservation times and available rental period time slots to allow time for one user to vacate the chair or area at the end of a rental period and before the next user arrives for a reservation, and this buffer may be included in the available rental period time slots displayed at step 154. Booking system 14 may also automatically suggest alternate chairs or areas at step 155 or the user may optionally request alternative suggestions at step 155.

Suggested chairs or areas at step 155 may include all chairs or areas with availability, but are preferably those that are in a predetermined proximity (such as 20 feet or 50 feet, for example) to the initially selected chair or area or that have similar features as the initially selected chair or area (such as proximity to a swimming pool, bar, or restroom, or shaded areas or sunny areas, for example). The suggested chair(s) or area(s) at step 155 are preferably currently available (at the time the user is checking availability) or will be available in a predetermined short period of time (such as 15 minutes or less), particularly when the initially selected chair or area does not have availability at step 153.

The user then selects one or more available time slots for the initially selected or alternative chair or area at step 94. At step 118, a user is preferably prompted to enter/create a user ID and login information (password) or continue as a guest, as previously described. At step 96, the user is prompted to enter payment information, or such information may be retrieved from a third party system 24, from payment information saved at step 136, as previously described. Payment is confirmed at step 98 and the rental is authorized. Preferably, a controller on band system 12 unlocks connector 70 at step 100, as previously described. A user then removes connector 70 from receptacle 38 and band 36 retracts at step 102 and the user occupies the chair or area at step 104.

Steps 106, 108, 110, 112, 114 are all as previously described with system 10. Once a rental/reservation end alert cycle is initiated at step 114 indicating a rental or reservation time has ended or is nearing an end time, booking system 14 preferably automatically determines if additional time is available for the chair or area at step 147. Alternatively, this may be determined in response to a user input indicating additional time is desired. Additional time availability at step 147 is preferably determined in the same manner as availability at step 153. Booking system 14 may also automatically suggest alternate chairs or areas at step 155, particularly if the current chair or area is not available for additional time continuous with the user's current time slot, or the user may optionally request alternative suggestions at step 155. The user then selects one or more additional available rental period time slots for the current or an alternative chair or area at step 116. The process repeats until the user vacates the chair at step 106 so that it is available for the next user to start at step 143.

Figure 15:
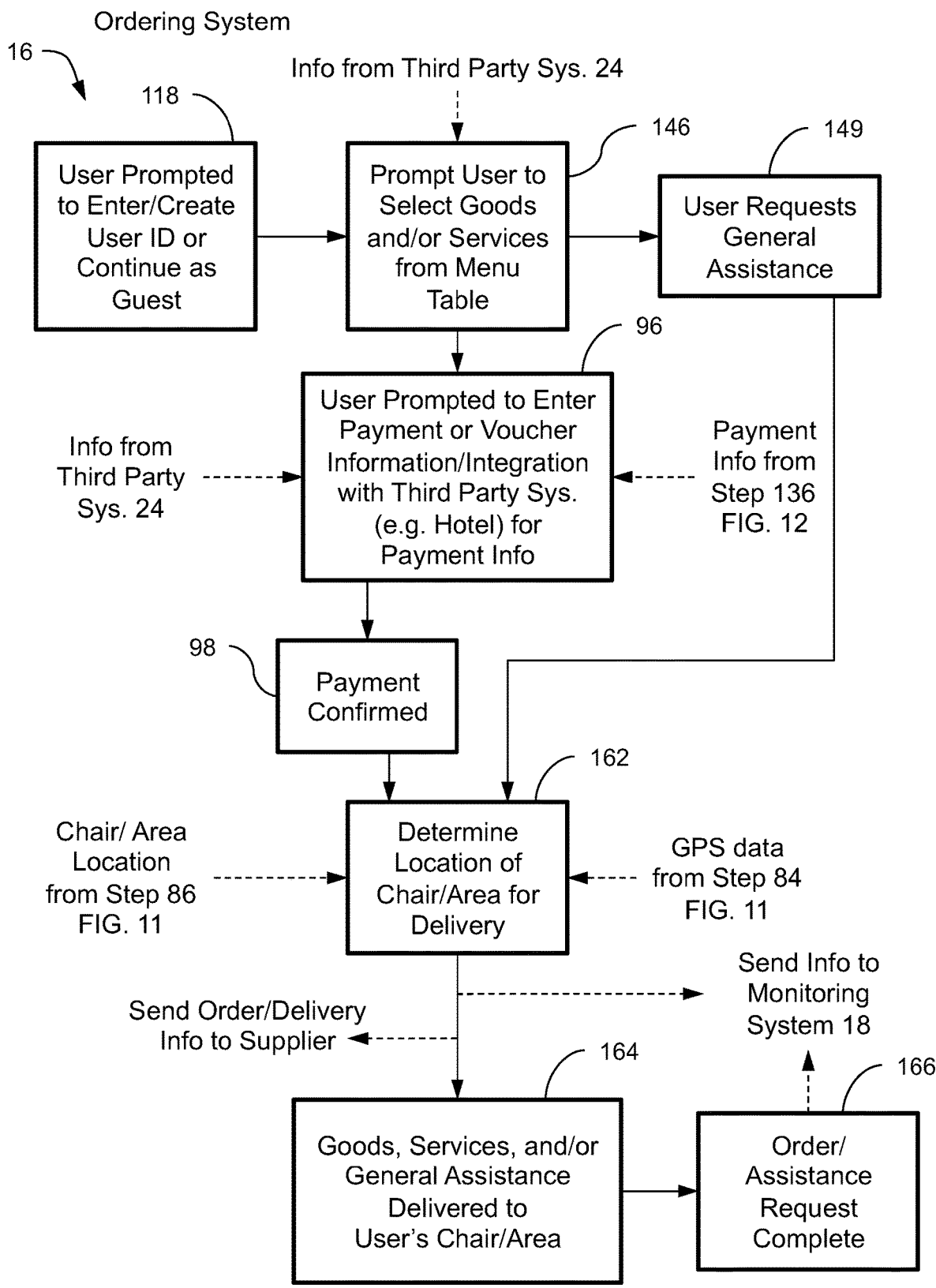
FIG. 15 is a flow chart showing preferred process steps for an order stage of the embodiment according to FIG. 10.

Referring to FIG. 15, a preferred embodiment of an ordering system and method 16 is shown. Prompts and data entry in ordering system 16 may be made through a user's computing device 26, a venue computing device or kiosk 22, or through a user interface 42 on a band system 12. At step 118, a user is preferably prompted to enter/create a user ID and login information (password) or continue as a guest, as previously described. The user is the prompted to select goods and/or services from a menu table at step 146, which may include selection of a particular third party vendor or supplier (e.g. a restaurant) if ordering system 14 is configured to allow goods and/or services to be ordered from third parties (as opposed to ordering from the venue). Data regarding available goods and/or services, such as food and drink available for delivery and pricing, is displayed to user at step 146. Data is retrieved from third party systems or databases 24 as needed. Ordering system 14 may be configured to only allow ordering of goods and services from the venue, but data may still be retrieved from venue systems or databases external to ordering system 14 and/or reservation system 310. A user is then prompted to enter payment information or such information is retrieved at step 96 as previously described and payment is confirmed at step 98. Chair or area location from step 86 and/or GPS data from step 84 are preferably used to determine a delivery location at step 162. A user may optionally request general assistance from venue employees at step 149, such as assistance with using ordering system 16, band system 12, or booking system 14, first aid, or general information regarding the venue. General assistance requests from step 149 are preferably sent to monitoring system 18 for response.

Order/assistance request and location information are preferably sent to the supplier (as applicable), which may be a third party or the venue (such as a hotel restaurant or room service system), for fulfillment and is also preferably sent to monitoring system 18 so venue employees can monitor the status of orders placed and assistance requested. Good and/or services or assistance is delivered to the user's chair or area at step 164 and the order or assistance request is marked as completed at step 166.

As an alternative, ordering system 14 may comprise a call button on band system 12 that allows a user to signal venue employees for assistance or ordering. Most preferably a call button is a lighted button on band system 12 that remains in a lit state until the call is answered by a venue employee. Once a call button is depressed a signal is sent to monitoring system 18 to notify venue employees that a request for service has been made. Alternatively, venue employees may visually monitor the venue to look for lit call buttons. Orders for goods and/or services or for general assistance may then be made directly through a venue employee, rather than through electronic communication to the supplier/venue.

Figure 16:
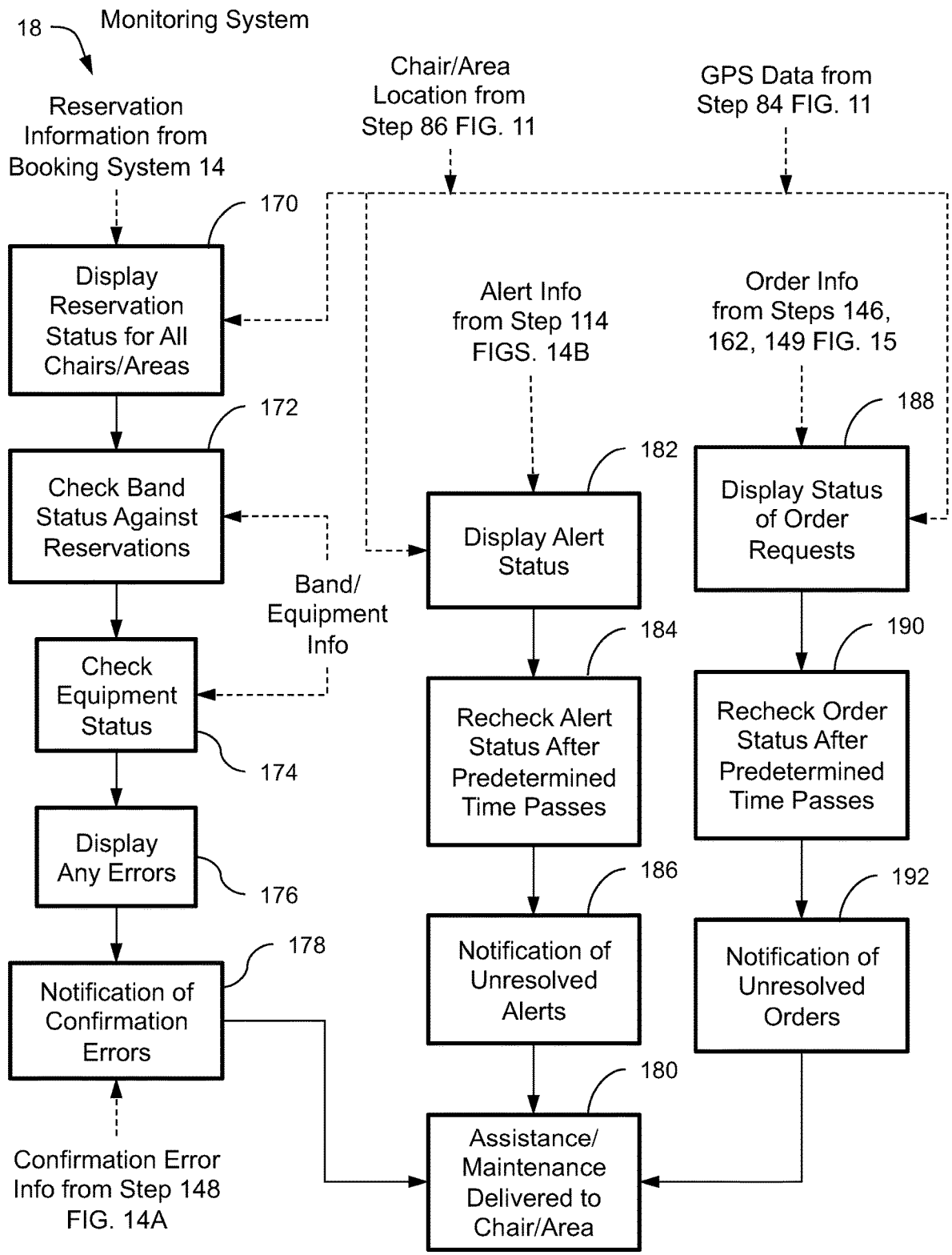
FIG. 16 is a flow chart showing preferred process steps for a monitoring stage of the embodiment according to FIG. 10.

Referring to FIG. 16, a preferred embodiment of a monitoring system and method 18 is shown. Most preferably, reservation information from booking system 14 is sent to monitoring system 18 and displayed at step 170. Reservation status for all chairs and areas is preferably displayed at step 170 and additional, specific reservation information for a selected chair or area may be optionally displayed as desired by a venue employee or operator. Most preferably, monitoring system 18 checks the connection status of each band connector 70 to receptacle 38 against the reservations at step 172. Additionally, any pressure or motion detected by a band system 12 controller, such as a user attempting to disconnect connector 70 from receptacle 38 or a user siting or leaning on band 36 or stepping over or ducking under band 36 that may indicate tampering is sent to monitoring system 18 to be checked against the reservation status at step 172 to determine if there is tampering or a user with a reservation or paid rental is having a problem with the equipment. Alternatively, tampering may be monitored through alert status steps 182, 184, and/or 186. The tampering and unauthorized use cycle 115 in FIG. 9 for system 10 are also preferably used in system 310, as part of a controller for band system 12 and/or part of monitoring system 18. General equipment status information for band systems 12 and/or venue kiosks 22, such as battery power level, communication status, and sensor status, for example are checked by monitoring system 18 at step 174. Any band status-reservation errors or equipment issues, such as if a band connector 70 is indicated as disconnected but no rental or reservation authorization is found for the particular band system 12, communication or sensor faults, and low battery levels, for example, are displayed at step 176. Monitoring system 18 also preferably receives notice of any reservation confirmation errors from step 148 and those errors are displayed at step 178. A venue employee or operator provides assistance to a user and/or equipment maintenance in response to such notifications at step 180.

Monitoring system and method 18 also preferably comprises steps related to alerts initiated by reservation system 310. Alert information from rental end alert cycle 114 and/or a tampering cycle 115 (FIG. 9), along with chair/area location 86 or GPS data 84, is sent to monitoring system 18 and displayed at step 182. Most preferably, monitoring system 18 rechecks the alert status (from an rental end alert cycle 114 and/or a tampering cycle 115) after a predetermined amount of time passes at step 184, preferably after 1 minute, more preferably after 5 minutes, to determine if the alert has been canceled at step 226 or continues at step 224. Most preferably, the predetermined amount of time at step 184 is longer than the pre-determined amount of time for rechecking a connector (or other sensor) and reservation/additional time status at steps 110, 222, and 228 in FIG. 9. This is because most alerts will be resolved by a user either voluntarily vacating a chair or area or paying for additional rental time, so there is no need for a venue employee or operator to immediately check on all alerts. If the alert continues after the predetermined time passes, notification is sent to a venue employee or operator or displayed at step 186. A venue employee or operator provides assistance to a user and/or equipment maintenance in response to such notifications at step 180.

Monitoring system and method 18 also preferably comprises steps related to orders placed through ordering system 16. Order information from steps 146, 149, along with chair/area location 86 or GPS data 84 (or delivery location from step 162), is sent to monitoring system 18 and displayed at step 188. Most preferably, monitoring system 18 rechecks the order status after a predetermined amount of time passes as step 190. The predetermined amount of time preferably varies by the type of order placed and relates to how long it generally or on average takes to fill that type of order. For example, a predetermined amount of time for a drink order may be 15 minutes, more preferably 10 minutes; for a food delivery from the venue may be 30 minutes, more preferably 20 minutes; for a food delivery from a third party may be 45 minutes, more preferably 30 minutes; and for a general assistance request may be 10 minutes, more preferably 5 minutes. For any delivery from a third party, the third party may provide an estimated delivery time at the time the order is placed, which may be conveyed to monitoring system 18 to use as the predetermined time for step 190. If the order remains unresolved (not delivered or marked as complete at step 166) after the predetermined time passes, notification is sent to a venue employee or operator or displayed at step 192. A venue employee or operator provides assistance to a user and/or coordinates with the supplier/third party to determine the status of the order in response to such notifications at step 180.

One or more features or capabilities of, or steps carried out by, a controller for a stand-alone band system 12 described herein with system and method 10 may be incorporated into one or more sub-systems 14, 16, 18, 20, and/or 22 with system 310. One or more features or capabilities of, or steps carried out by, sub-systems 12, 14, 16, 18, 20, and/or 22 described herein as part of a reservation system 310, may be incorporated into one or more other system-systems of system 310 and/or incorporated into a stand-alone band system 12 that is part of reservation system 10.

According to one preferred embodiment, a system for carrying out the preferred methods 10 and/or 310 for reserving seating according to the invention comprises:

a band system 12;
one or more computing devices, such as 27, 26, 22, or a controller accessible through user interface 42, with or without a server, having a user interface, memory, and processing capabilities to allow steps of a software component to be carried out, and optionally to allow communication via the internet, cellular connection, wired or wireless communication with one or more external devices (an external computer, terminal, or computing device, an external database, an externally hosted software site, file sharing site, one or more sensors on a band system 12, and/or a controller on a bad system 12);
a software component installed on the user's computing device 26, a venue computing device 22, an operator's computing device 27, or a controller in band system 12 for managing, initiating, and carrying out one or more of the method steps of FIGS. 8-16;
a database system or similar data storage capability for storing data entered regarding one or more of a user, rental and reservation records for a user, rental and reservation records for a venue, ordering information, payment information, rules or limits imposes on a user's ability to add rental time or make future reservations, points or rewards for rentals, sensor data, map information, GPS data, and other data and information referenced in FIGS. 8-16; and
if the software component is hosted externally from the user's computing device 26 or a venue computing device 22 or a controller in band system 12, preferably a computerized server connected to a network to host the software (such as on an operator's computing device 27), preferably containing at least a portion of the database system, and to allow communication with and between one or more of a user's computing device 26, a venue computing device 22, third party systems/computing devices 24, sensors associated with seating or band system 12, and/or a controller in band system 12 via the internet, cellular connection, or other wired or wireless communication.

As used herein, a computing device refers to a computer, terminal, smart phone, tablet, or similar devices, preferably having a processor, memory storage capability, and a user interface and/or display to allow execution of the software component to carry out the steps of the methods of the embodiments of the invention. Steps described herein as a prompt to a user may alternatively be a tab, drop-down box, or other option to be selected by the user or recipient.

Unless a specific format is indicated as required, references herein to pay, paying, payment or the like include payment by cash, credit card, bit coin, electronic funds transfer, or any other type of transfer of money or valuable goods from a user to the venue or operator of systems 10 or 310 or the use of a voucher (in lieu of a money or goods transferred from a user to the venue or operator), such as a voucher issued by a hotel allowing a guest user to rent seating without charge to the user. Unless a specific format is indicated as required, references herein to sending or displaying or providing results or information include any manner of sending, displaying, or providing the results or information, such as displayed on a screen or user interface, text message, sent by emails, printouts, postal mail, courier, providing access to downloadable information, providing link to external websites containing information, displaying graphics, displaying photos, and displaying videos, providing pop-ups containing information, uploading to a file sharing site, or other electronic means. As used herein, an "entry" in relation to an area refers to a doorway or other opening through which a user may enter into and exit from an area of a venue, such as a VIP seating area, private lounge, or cabana, may be made.

The shapes used in the flow chart figures are not intended to be limiting to a particular type of flow chart step. Reference numerals used to describe steps of a method herein may also describe the information, data, or results that are input to and/or output from such step. For example, reference number 88 refers to a map creating step and refers to the map created at that step. Although not specifically depicted in the figures, additional steps may be added, including additional steps to save data and information, display data and information, and/or communicate data or information between systems, sub-systems, and devices, as will be understood by those of ordinary skill in the art.

One or more components or steps described with one preferred embodiment of a system or method according to the invention may be used with another embodiment of the system or method, even if not specifically described in connection with that embodiment. Any combination of optional stages or steps may be used in connection with the preferred methods and system of the invention. Additionally, any step or feature described with one preferred embodiment may be used with any other preferred embodiment, even if not specifically described with such embodiment. Those of ordinary skill in the art will also appreciate upon reading this specification, that modifications and alterations to the methodology and system for reserving seating may be made within the scope of the invention and it is intended that the scope of the invention disclosed herein be limited only by the broadest interpretation of the appended claims to which the inventors are legally entitled.

What is claimed is:

1. A system for reserving seating at one or more venues, the system comprising a band system for each rentable seating, wherein the band system comprises:
    a retractable band moveable from a closed position to an open position to allow access to the seating when a rental period is authorized;
    a first body;
    a second body comprising a first user interface;
    a receptacle configured to receive a connector attached to a first end of the retractable band to releasably hold the retractable band in the closed position;
    a spool connected to a second end of the retractable band and configured to retract the band around the spool to the open position when the connector is released from the receptacle;
    a controller configured to receive data or signals from one or more sensors and to send and receive data or signals to and from the user interface;
    wherein the spool is attached to or disposed within one of the bodies and the receptacle is attached to or disposed at least partially in the other of the bodies; and
    wherein the seating comprises a chair or an area and the bodies are attached to the chair or are disposed in proximity to an entry for the area at a venue.

2. The system of claim 1 wherein the user interface further comprises a (1) keypad, (2) a touch screen, (3) a reader or a scanner to swipe a credit card, hotel room key, RFID chip, QR code, a bar code; or (4) a combination thereof to allow a user to enter user information; and
    wherein the user information comprises one or more of a rental period, user identification information, and payment information.

3. The system of claim 2 wherein the controller is configured to authorize the rental period based on the user inputs.

4. The system of claim 3 wherein the controller is configured to initiate an alert if (1) the one or more sensors detect pressure on or movement of the connector, the receptacle, the band, the spool or a combination thereof and no rental period has been authorized or (2) an authorized rental period ends and the one or more sensors detect the band is in the open position or the seating is still occupied.

5. The system of claim 1 wherein the sensors detect the band is in an open position when there is no contact between the connector and the receptacle.

6. The system of claim 4 wherein the rental period is authorized when a payment for the rental period is confirmed.

7. The system of claim 1 further comprising:
    a first computing device comprising a processor, a software component, and optionally a second user interface, the first computing device configured to communicate with the band system controller and optionally a second computing device or both;
    a database accessible by the first computing device for storing information regarding reservations made for rentable seating at each of the one or more venues; and
    wherein the software component is configured to (1) accepts user inputs comprising one or more of a requested reservation date, user identification information, and payment information entered by a user; (2) compares a user's requested reservation date to other reservations in the database for the requested reservation date; (3) compiles information regarding available seatings, such information comprising a seating identifier or band system identifier, seating location, available use times, pricing, and optionally available use times on alternate dates or for alternate seating; (4) sends the information regarding the available seatings to the user, (5) allows a user to select one or more of the available seatings for a date and an available use time; (6) processes payment for the one or more selected seatings; and (7) saves a user's selected seating, date, and use time as the user's reservation in the database.

8. The system of claim 7 wherein the first computing device sends information regarding the user's reservation to the controller for the band system associated with the user's selected seating and wherein the controller allows the connector to be disconnected from the receptacle at the date and time indicated in the user's reservation.

9. The system of claim 8 wherein the controller for the band system associated with the user's selected seating is configured to initiate an alert if the user's reservation ends and the one or more sensors detect the band is in the open position or the seating is still occupied.

10. The system of claim 8 wherein the controller allows the connector to be disconnected from the receptacle at the date and time indicated in the user's reservation only after the user confirms the user's reservation through the user interface for the band system associated with the user's reservations.

11. A method for reserving seating at one or more venues, the method comprising:
    providing a band system for each rentable seating, the band system comprising (1) a retractable band moveable from a closed position to an open position to allow access to the seating during an authorized rental period, (2) a first body, (3) a second body comprising a user interface, (4) a receptacle configured to receive a connector attached to a first end of the retractable band to releasably hold the retractable band in the closed position, (5) a spool connected to a second end of the retractable band and configured to retract the retractable band around the spool to the open position when the connector is released from the receptacle, and (6) a controller configured to receive data or signals from one or more sensors and to send and receive data or signals to and from the user interface;
    prompting a user to enter user information comprising one or more of a rental period, user identification information, and payment information;
    authorizing use of a selected seating by the user for the rental period based on the user information;
    wherein the spool is attached to or disposed within one of the bodies and the receptacle is attached to or disposed at least partially in the other of the bodies; and
    wherein the seating comprises a chair or an area and the bodies are attached to the chair or are disposed in proximity to an entry for the area at a venue.

12. The method of claim 11 wherein the authorizing step comprises confirming payment for the rental period.

13. The method of claim 11 further comprising: initiating an alert when (1) the one or more sensors detects pressure or movement on the connector, the receptacle, the spool, the retractable band, or a combination thereof and no rental period has been authorized or (2) an authorized rental period ends and the one or more sensors detect the band is in the open position.

14. The method of claim 11 wherein the user information further comprises a requested reservation date, the method further comprising:

comparing the user's requested reservation date to other reservations for seating in a venue for the requested reservation date;

determining available seatings for the requested reservation date and optionally for alternate dates;

displaying information regarding available seatings, such information comprising (1) a seating identifier or band system identifier and (2) available use times and optionally (3) one or more of pricing and available use times on alternate dates;

allowing the user to select one or more of the available seatings for a date and an available use time; and saving the user's selected seating, date, and use time as the user's reservation.

15. The method of claim 14 wherein the authorizing step comprises processing payment for the user's reservation.

16. The method of claim 14 further comprising allowing the connector to be disconnected from the receptacle at the date and time indicated in the user's reservation.

17. The method of claim 16 further comprising:

saving identifying information associated with the user's reservation, the information comprising a credit card number, hotel room key data, confirmation number, user identification information, a QR code, or a bar code;

prompting the user to provide the identifying information associated with the user's reservation through the user interface for the band system associated with the user's selected seating; and comparing the identifying information provided by the user to the saved identifying information and only allowing the connector to be disconnected from the receptacle if the identifying information matches.

18. The method of claim 17 wherein the user provides the identifying information by entering the identifying information on a keypad or through an audio system or by scanning or swiping a credit card, hotel room key card, RFID chip, QR code, or bar code.

* * * * *